(12) United States Patent
Ciocia

(10) Patent No.: US 12,442,364 B2
(45) Date of Patent: Oct. 14, 2025

(54) TWO-STAGE PUMP AND METHOD OF OPERATION

(71) Applicant: Aperia Technologies, Inc., Hayward, CA (US)

(72) Inventor: Kevin Ciocia, Burlingame, CA (US)

(73) Assignee: Aperia Technologies, Inc., Hayward, CA (US)

( * ) Notice: Subject to any disclaimer, the term of this patent is extended or adjusted under 35 U.S.C. 154(b) by 72 days.

(21) Appl. No.: 18/535,939

(22) Filed: Dec. 11, 2023

(65) Prior Publication Data

US 2025/0188915 A1  Jun. 12, 2025

(51) Int. Cl.

| | |
|---|---|
| *F04B 35/01* | (2006.01) |
| *B60C 23/12* | (2006.01) |
| *F04B 5/02* | (2006.01) |
| *F04B 39/00* | (2006.01) |
| *F04B 39/06* | (2006.01) |
| *F04B 53/08* | (2006.01) |
| *F04B 53/12* | (2006.01) |

(52) U.S. Cl.
CPC ............ *F04B 35/01* (2013.01); *B60C 23/121* (2020.05); *B60C 23/126* (2020.05); *B60C 23/127* (2020.05); *B60C 23/133* (2020.05); *B60C 23/137* (2020.05); *F04B 5/02* (2013.01); *F04B 39/0016* (2013.01); *F04B 39/06* (2013.01); *F04B 53/08* (2013.01); *F04B 53/12* (2013.01)

(58) Field of Classification Search
CPC ...... F04B 35/01; F04B 39/06; F04B 39/0016; F04B 53/08; F04B 53/12; F04B 5/02; B60C 23/121; B60C 23/126; B60C 23/127; B60C 23/133; B60C 23/137
See application file for complete search history.

(56) References Cited

U.S. PATENT DOCUMENTS

| | | | | |
|---|---|---|---|---|
| RE6,703 E | * | 10/1875 | Bean .............................. | 417/259 |
| RE9,903 E | * | 10/1881 | Bean .............................. | 417/259 |
| 1,023,685 A | * | 4/1912 | Ruwell ................... | F04B 1/053 |
| | | | | 91/475 |

(Continued)

FOREIGN PATENT DOCUMENTS

| | | |
|---|---|---|
| CN | 2202665 Y | 7/1995 |
| CN | 2496691 Y | 6/2002 |

(Continued)

OTHER PUBLICATIONS

"Controlled Stirling Thermocompressors", Vanderbilt School of Engineering, Laboratory for the DCES, fist downloaded Sep. 5, 2023, https://my.vanderbilt.edu/dces/projects/controlled-stirling-thermocompressors/.

(Continued)

*Primary Examiner* — Christopher S Bobish
(74) *Attorney, Agent, or Firm* — Jeffrey Schox; Diana Lin

(57) ABSTRACT

In variants, a two-stage pump can include a piston and a cylinder cooperatively defining a first stage in front of the piston fluidly connected to a second stage behind the piston, wherein a forward stroke of the piston pressurizes working fluid in the first stage and forces pressurized working fluid into the second stage, and a backward stroke of the piston further pressurizes working fluid in the second stage and exhausts pressurized working fluid out a pump exhaust.

17 Claims, 16 Drawing Sheets

(56) References Cited

U.S. PATENT DOCUMENTS

| | | | |
|---|---|---|---|
| 1,057,846 A * | 4/1913 | Kanter | B60C 23/137 152/417 |
| 1,105,057 A * | 7/1914 | Barnfather | B60C 23/126 152/420 |
| 1,127,079 A * | 2/1915 | Nielsen | B60C 23/131 152/418 |
| 1,134,186 A * | 4/1915 | Drew | B60C 23/129 152/419 |
| 1,182,428 A * | 5/1916 | Sheiban | B60C 23/129 152/419 |
| 1,254,903 A | 1/1918 | Hall | |
| 1,358,524 A | 11/1920 | Cooper | |
| 1,448,248 A | 3/1923 | Anthony | |
| 1,539,900 A | 6/1925 | Harvey | |
| 2,211,935 A * | 8/1940 | Parker | B60C 23/137 152/418 |
| 2,415,618 A * | 2/1947 | West | F04B 39/0005 92/182 |
| 2,899,907 A | 8/1959 | Becher | |
| 2,962,119 A | 11/1960 | White | |
| 3,012,820 A | 12/1961 | King | |
| 3,047,339 A | 7/1962 | Hamer | |
| 3,152,553 A | 10/1964 | Sverker | |
| 3,175,507 A | 3/1965 | Sverker | |
| 3,249,059 A | 5/1966 | Renn | |
| 3,400,074 A | 9/1968 | Grenci | |
| 3,452,801 A | 7/1969 | Fletcher et al. | |
| 3,511,294 A | 5/1970 | Bepristis et al. | |
| 3,532,449 A | 10/1970 | Garton | |
| 3,730,215 A | 5/1973 | Conery et al. | |
| 3,886,974 A | 6/1975 | Bjorklund | |
| 3,927,708 A * | 12/1975 | Hulme | B60C 23/127 152/418 |
| 3,981,633 A | 9/1976 | Wall | |
| 4,018,579 A | 4/1977 | Hofmann | |
| 4,030,300 A | 6/1977 | Thompson | |
| 4,095,923 A | 6/1978 | Cullis | |
| 4,121,472 A | 10/1978 | Vural et al. | |
| 4,157,530 A | 6/1979 | Merz | |
| 4,256,971 A | 3/1981 | Griffith | |
| 4,291,235 A | 9/1981 | Bergey et al. | |
| 4,370,894 A | 2/1983 | Sturesson | |
| 4,460,006 A | 7/1984 | Kolze | |
| 4,536,668 A | 8/1985 | Boyer | |
| 4,606,710 A | 8/1986 | Maguire | |
| 4,637,152 A | 1/1987 | Roy | |
| 4,651,792 A | 3/1987 | Taylor | |
| 4,744,399 A | 5/1988 | Magnuson et al. | |
| 4,768,542 A | 9/1988 | Morris | |
| 4,776,774 A | 10/1988 | Anastasia | |
| 4,807,487 A | 2/1989 | Seidl | |
| 4,819,593 A | 4/1989 | Bruener et al. | |
| 4,832,578 A * | 5/1989 | Putt | F04B 35/045 417/418 |
| 4,852,528 A | 8/1989 | Richeson et al. | |
| 4,893,459 A | 1/1990 | Orlando | |
| 4,895,199 A | 1/1990 | Magnuson et al. | |
| 4,910,148 A | 3/1990 | Sorensen et al. | |
| 4,922,984 A | 5/1990 | Dosjoub et al. | |
| 5,018,797 A | 5/1991 | Takata | |
| 5,052,456 A | 10/1991 | Dosjoub | |
| 5,173,038 A | 12/1992 | Hopfensperger et al. | |
| 5,201,968 A | 4/1993 | Renier | |
| 5,293,919 A | 3/1994 | Olney et al. | |
| 5,325,902 A | 7/1994 | Loewe et al. | |
| 5,342,177 A | 8/1994 | Cheng | |
| 5,370,711 A | 12/1994 | Audit et al. | |
| 5,375,984 A | 12/1994 | Wehling | |
| 5,388,470 A | 2/1995 | Marsh | |
| 5,409,049 A | 4/1995 | Renier | |
| 5,413,159 A | 5/1995 | Olney et al. | |
| 5,429,927 A | 7/1995 | Afseth et al. | |
| 5,468,129 A | 11/1995 | Sunden et al. | |
| 5,482,447 A | 1/1996 | Sunden et al. | |
| 5,495,879 A | 3/1996 | Cabestrero | |
| 5,512,439 A | 4/1996 | Hornes et al. | |
| 5,525,493 A | 6/1996 | Hornes et al. | |
| 5,538,062 A | 7/1996 | Stech | |
| 5,591,281 A * | 1/1997 | Loewe | F04B 35/00 417/233 |
| 5,646,727 A | 7/1997 | Hammer et al. | |
| 5,667,606 A * | 9/1997 | Renier | B60C 23/127 417/233 |
| 5,707,215 A | 1/1998 | Olney et al. | |
| 5,759,820 A | 6/1998 | Hornes et al. | |
| 5,894,757 A | 4/1999 | Sully | |
| 5,941,692 A | 8/1999 | Olney et al. | |
| 5,941,696 A | 8/1999 | Fenstermacher et al. | |
| 5,947,696 A * | 9/1999 | Baumgarten | F04B 35/06 417/233 |
| 6,092,545 A | 7/2000 | Bedore et al. | |
| 6,144,295 A | 11/2000 | Adams et al. | |
| 6,267,450 B1 | 7/2001 | Gamble | |
| 6,360,768 B1 | 3/2002 | Galler | |
| 6,463,798 B2 | 10/2002 | Niekerk et al. | |
| 6,474,832 B2 | 11/2002 | Murray | |
| 6,482,592 B1 | 11/2002 | Lundeberg et al. | |
| 6,494,693 B1 | 12/2002 | Sunden | |
| 6,742,386 B1 | 6/2004 | Larson | |
| 6,744,356 B2 | 6/2004 | Hamilton et al. | |
| 6,787,233 B1 | 9/2004 | Molteberg et al. | |
| 6,814,547 B2 | 11/2004 | Childers et al. | |
| 6,871,683 B2 | 3/2005 | Cobb | |
| 6,984,702 B2 | 1/2006 | Fonnum et al. | |
| 6,986,913 B2 | 1/2006 | Fonnum et al. | |
| 6,994,136 B2 | 2/2006 | Stanczak | |
| 7,117,731 B2 | 10/2006 | Hrabal | |
| 7,160,707 B2 | 1/2007 | Fonnum et al. | |
| 7,173,124 B2 | 2/2007 | Deggerdal et al. | |
| 7,217,762 B1 | 5/2007 | Joergedal et al. | |
| 7,222,487 B1 | 5/2007 | Hinkley | |
| 7,225,845 B2 | 6/2007 | Ellmann | |
| 7,237,590 B2 | 7/2007 | Loewe | |
| 7,255,323 B1 | 8/2007 | Kadhim | |
| 7,322,804 B2 * | 1/2008 | Humburg | F04B 13/00 417/525 |
| 7,357,164 B2 | 4/2008 | Loewe | |
| 7,498,683 B2 | 3/2009 | Landwehr | |
| 7,506,663 B2 | 3/2009 | Thomas et al. | |
| 7,581,576 B2 | 9/2009 | Nakano | |
| 7,607,465 B2 | 10/2009 | Loewe | |
| 7,614,474 B2 | 11/2009 | Yang | |
| 7,625,189 B2 | 12/2009 | Cheng | |
| 7,704,057 B2 | 4/2010 | Malbec et al. | |
| 7,748,422 B2 | 7/2010 | Bol | |
| 7,763,689 B2 | 7/2010 | Fonnum et al. | |
| 7,784,513 B2 | 8/2010 | Loewe | |
| 7,789,638 B2 | 9/2010 | Chuang | |
| 7,810,582 B2 | 10/2010 | Webb | |
| 7,828,095 B2 | 11/2010 | Murata et al. | |
| 7,828,101 B2 | 11/2010 | Radtke et al. | |
| 7,847,421 B2 | 12/2010 | Gardner et al. | |
| 7,856,871 B2 | 12/2010 | Mancosu et al. | |
| 7,927,170 B2 | 4/2011 | Bickerton et al. | |
| 7,931,061 B2 | 4/2011 | Gonska et al. | |
| 7,931,817 B2 | 4/2011 | Bilski | |
| 7,975,789 B2 | 7/2011 | Murata | |
| 7,985,340 B2 | 7/2011 | Almaasbak et al. | |
| 7,989,614 B2 | 8/2011 | Deggerdal et al. | |
| 7,989,975 B2 | 8/2011 | Clement et al. | |
| 8,004,104 B2 | 8/2011 | Hench | |
| 8,022,561 B2 | 9/2011 | Ciglenec et al. | |
| 8,038,987 B2 | 10/2011 | Fonnum et al. | |
| 8,042,586 B2 | 10/2011 | Losey et al. | |
| 8,083,503 B2 | 12/2011 | Voltenburg et al. | |
| 8,110,351 B2 | 2/2012 | Bosnes | |
| 8,113,254 B2 | 2/2012 | Benedict | |
| 8,550,794 B2 | 10/2013 | Du | |
| 8,747,084 B2 | 6/2014 | Richardson et al. | |
| 8,763,661 B2 | 7/2014 | Richardson | |
| 9,039,392 B2 | 5/2015 | Richardson et al. | |
| 9,145,887 B2 | 9/2015 | Richardson | |
| 9,151,288 B2 | 10/2015 | Richardson et al. | |

(56) References Cited

U.S. PATENT DOCUMENTS

| | | | |
|---|---|---|---|
| 9,938,967 B2* | 4/2018 | Ignatiev | F04B 25/005 |
| 10,814,684 B2* | 10/2020 | Richardson | G05D 7/0617 |
| 2004/0050760 A1 | 3/2004 | Siegfriedsen | |
| 2006/0169349 A1 | 8/2006 | Nakano | |
| 2007/0018458 A1 | 1/2007 | Martinez | |
| 2007/0040135 A1 | 2/2007 | Dyer et al. | |
| 2007/0068238 A1 | 3/2007 | Wendt | |
| 2007/0151648 A1 | 7/2007 | Loewe | |
| 2008/0003110 A1 | 1/2008 | Isono | |
| 2008/0190535 A1 | 8/2008 | Concu | |
| 2008/0247883 A1 | 10/2008 | Yokomachi et al. | |
| 2009/0048733 A1 | 2/2009 | Isono | |
| 2009/0151835 A1 | 6/2009 | Manning | |
| 2009/0301575 A1 | 12/2009 | Arnett | |
| 2010/0243121 A1 | 9/2010 | Eigenbrode | |
| 2011/0018275 A1 | 1/2011 | Sidenmark | |
| 2011/0061621 A1 | 3/2011 | Finkenbiner | |
| 2011/0308953 A1 | 12/2011 | Bazant et al. | |
| 2012/0018070 A1 | 1/2012 | Schulte et al. | |
| 2012/0020822 A1 | 1/2012 | Richardson et al. | |
| 2013/0251553 A1 | 9/2013 | Richardson et al. | |
| 2014/0023518 A1 | 1/2014 | O'Brien et al. | |
| 2014/0186195 A1 | 7/2014 | Richardson et al. | |
| 2015/0239309 A1 | 8/2015 | Root | |
| 2016/0288591 A1* | 10/2016 | Becker | B60C 23/004 |
| 2017/0015159 A1 | 1/2017 | Richardson | |
| 2018/0003164 A1 | 1/2018 | Avanzi | |
| 2018/0010592 A1 | 1/2018 | Chuang | |
| 2018/0065429 A1* | 3/2018 | Richardson | F04B 35/01 |
| 2018/0104994 A1* | 4/2018 | Lin | B60C 23/137 |
| 2020/0130435 A1 | 4/2020 | Root et al. | |
| 2020/0130436 A1 | 4/2020 | Root et al. | |
| 2020/0130437 A1 | 4/2020 | Root et al. | |
| 2021/0061028 A1 | 3/2021 | Da Deppo et al. | |
| 2021/0125428 A1 | 4/2021 | Tedesco et al. | |

FOREIGN PATENT DOCUMENTS

| | | |
|---|---|---|
| CN | 101415946 A | 4/2009 |
| DE | 4042446 A1 | 7/1992 |
| DE | 4127002 A1 | 2/1993 |
| GB | 530005 A | 12/1940 |
| GB | 1017074 A | 1/1966 |
| GB | 2089297 A | 6/1982 |
| JP | 2005231573 A | 9/2005 |
| RU | 2735050 C2 | 10/2020 |
| WO | 2012012617 A2 | 1/2012 |

OTHER PUBLICATIONS

Kumar, Metta Naveen, "Working principles of multistage compressors on board ship", Marine Engineers Knowledge, Sep. 9, 2020, https://www.marineengineersknowledge.com/2020/09/working-principles-of-multistage.html.

* cited by examiner

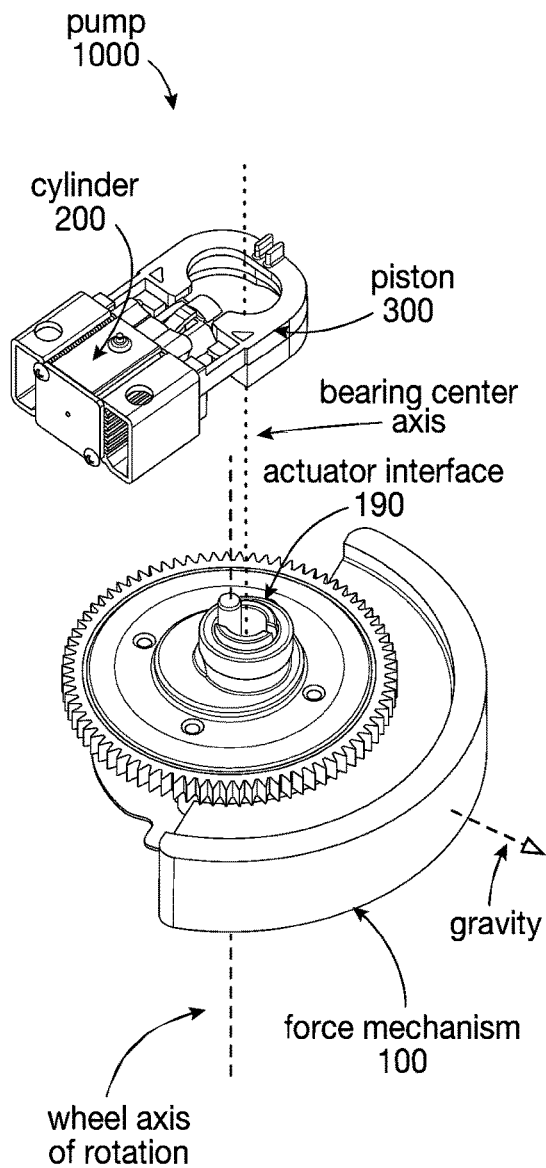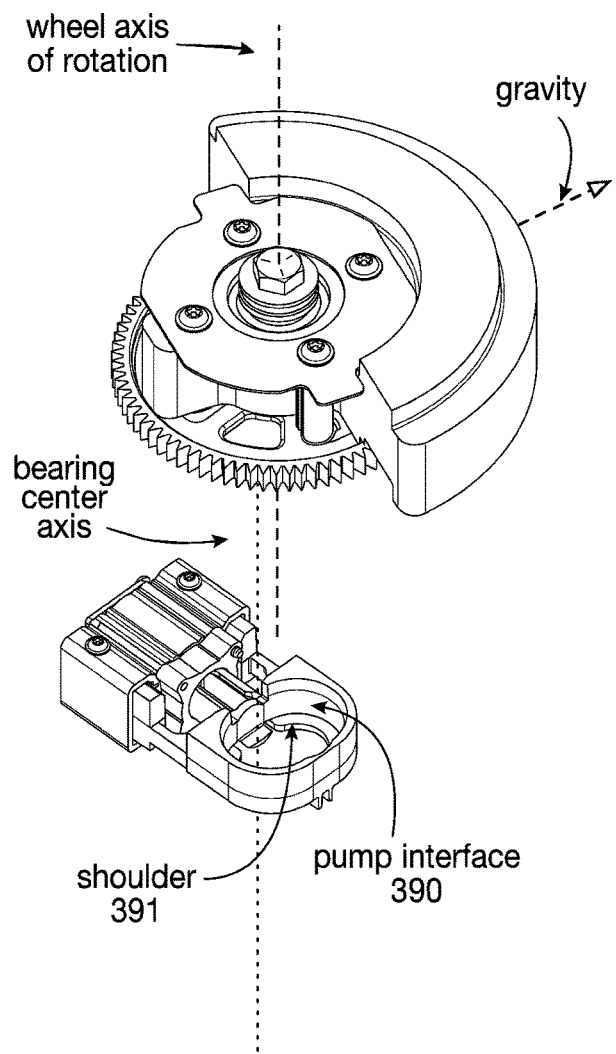
FIGURE 4A
FIGURE 4B

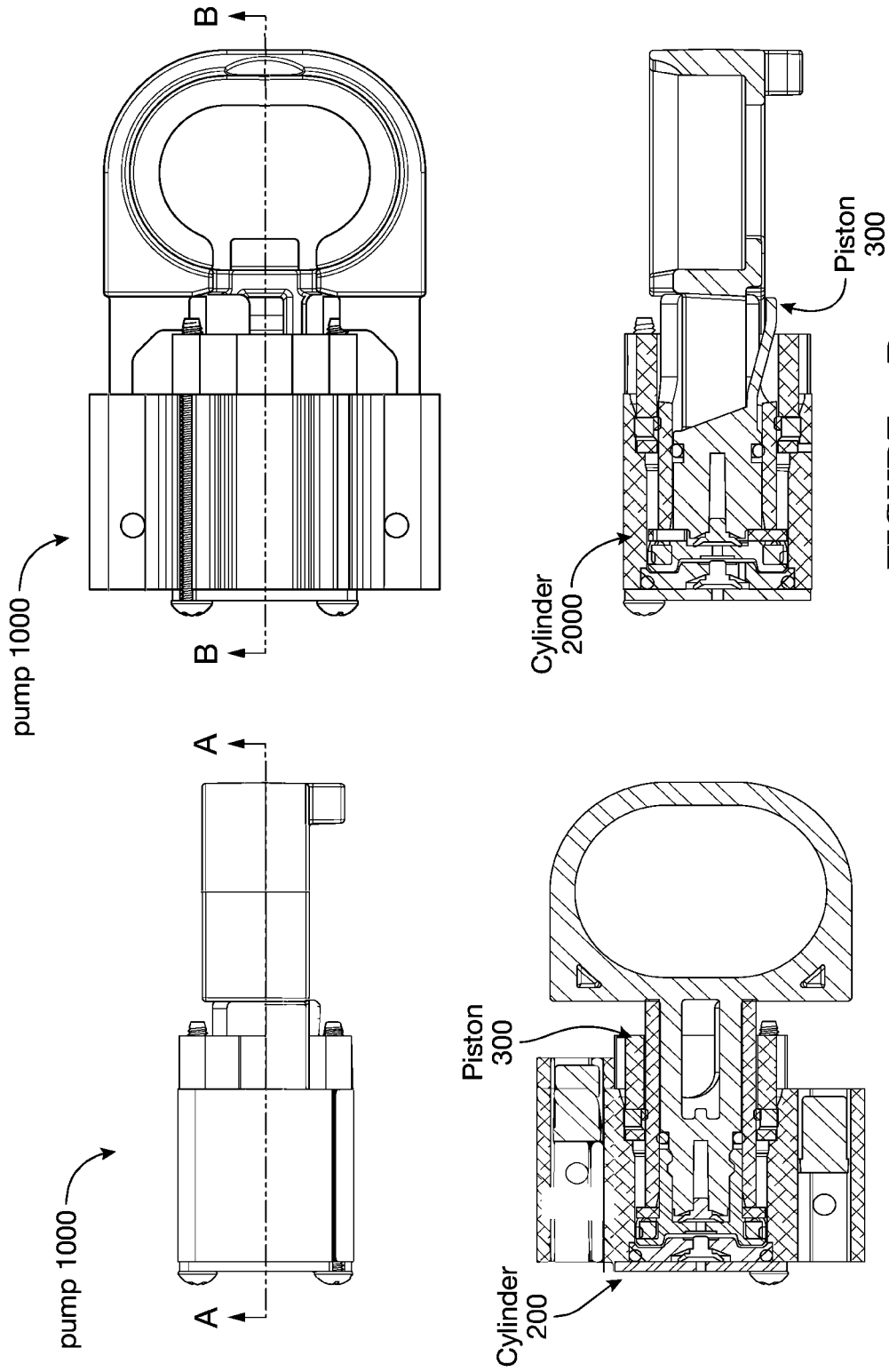

TWO-STAGE PUMP AND METHOD OF OPERATION

TECHNICAL FIELD

This invention relates generally to the tire inflation field, and more specifically to a new and useful system and method in the tire inflation field.

BRIEF DESCRIPTION OF THE FIGURES

FIGS. 4A and 4B are exploded assembly views of a variant of the pump and eccentric mass.

FIGS. 13A and 13B are orthographic cross sectional views along section A-A and section B-B of an example of the pump in the bottom dead center position, respectively.

DETAILED DESCRIPTION

Figure 1:
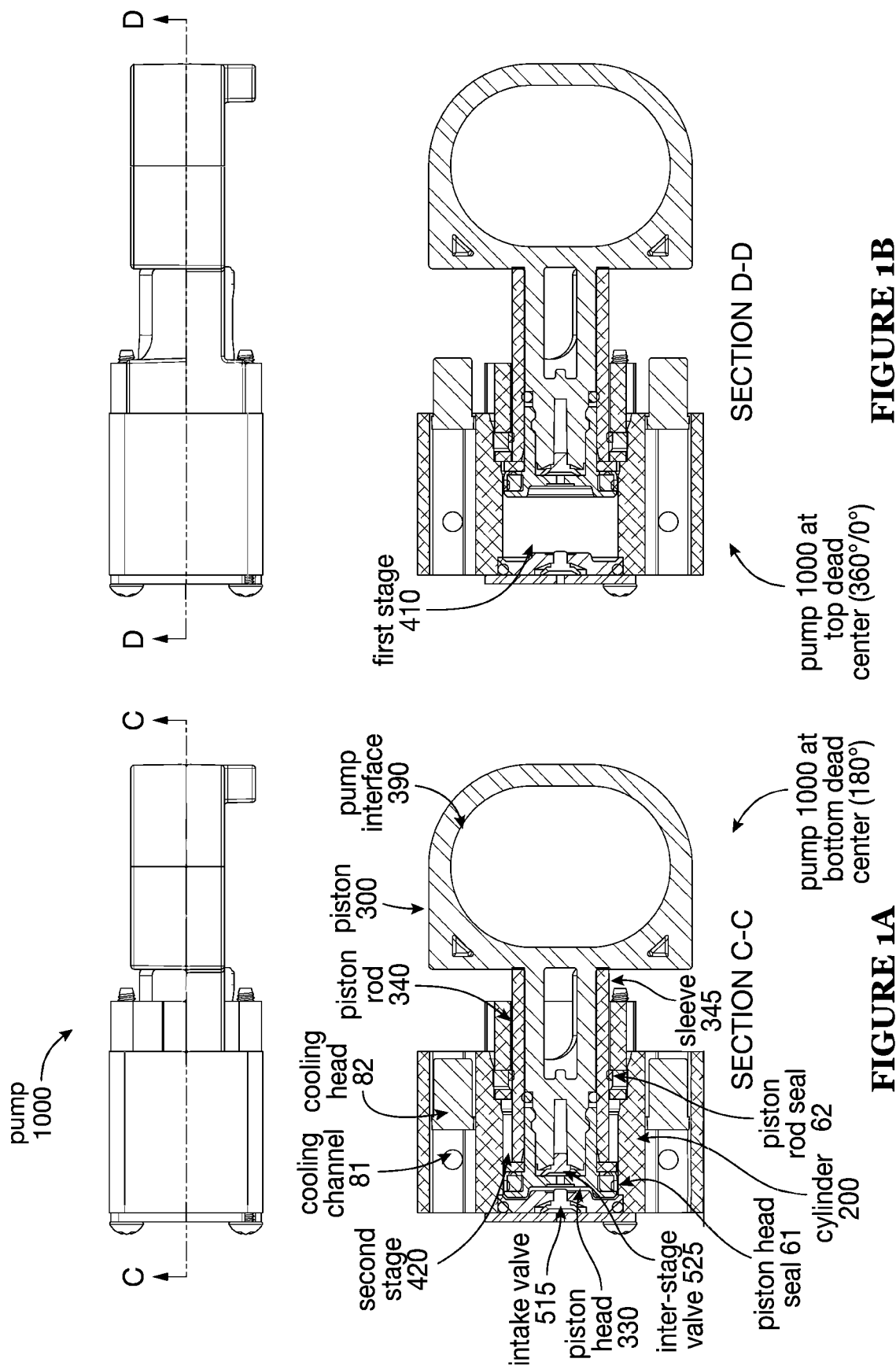
FIGS. 1A and 1B is a set of orthographic cross sectional views of a variant of the pump in a bottom dead center position and a top dead center position, respectively.

The following description of the embodiments of the invention is not intended to limit the invention to these embodiments, but rather to enable any person skilled in the art to make and use this invention.

1. Overview

In variants, the pump 1000 can include a piston 300 and a cylinder 200 cooperatively defining a first stage 410 in front of the piston 300 and a second stage 420 behind the piston 300 (e.g., examples shown in FIG. 1, FIG. 3, FIG. 11, FIGS. 12A-12G, and FIG. 15). The pump 1000 can function as a two-stage pump and can pressurize fluid during both the forward and backward strokes of the piston 300. In an example, the pump 1000 can, during a backstroke: draw in working fluid S100 into the first stage 410 while compressing working fluid to a second pressure S400 in the second stage 420 and exhausting the compressed working fluid at the second pressure S500; and, during a forward stroke: compress the working fluid to a first pressure S200 in the first stage 410 and move compressed working fluid at the first pressure from the first stage to the second stage S300.

In variants, the pump can be incorporated into a tire inflation system or be otherwise used. The tire inflation system can be configured to mount to a wheel (e.g., a wheel end), wherein a force mechanism 100 of the tire inflation system can drive piston actuation and the pump exhaust path 530 can be fluidly connected to a tire interior.

Figure 8:
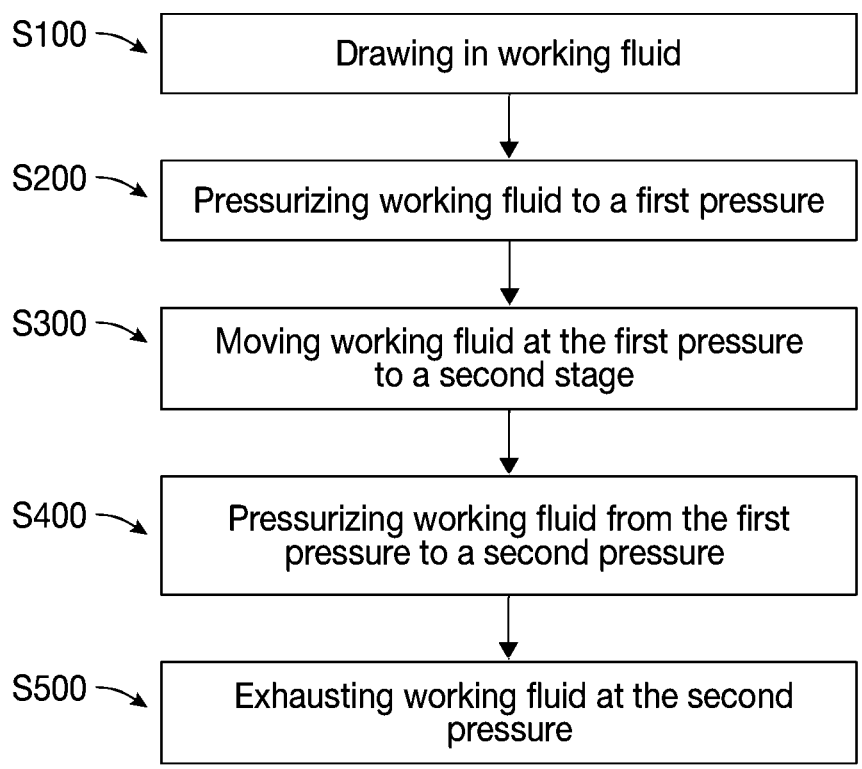
FIG. 8 is a schematic representation of a variant of the method.

As shown in FIG. 8, in variants, the method for pressurizing working fluid includes: drawing in working fluid S100, pressurizing working fluid to a first pressure S200, moving working fluid at the first pressure to a second stage S300, pressurizing working fluid from the first pressure to a second pressure S400, and exhausting the working fluid at the second pressure S500.

In an illustrative example, the pump 1000 can include: a cylinder 200 and a piston 300 cooperatively defining: a first stage 410 between a cylinder first end and the front of the piston 300 (e.g., front of the piston head 330); and a second stage 420 between a cylinder second end (opposing the first end) and the back of the piston 300 (e.g., back of the piston head 330). In specific examples, the piston rod is attached to the back of the piston head 330, wherein an opposing end of the piston rod (e.g., the pump interface) is connected to the force mechanism 100 that drives pump actuation (e.g., wherein the first stage 410 opposes the piston rod, the second stage 420, and the force mechanism 100 across the piston head 330). The cylinder first end can define an intake fluid path 510 fluidly connecting the ambient environment with the first stage 410, wherein fluid flow through the intake fluid path 510 can be controlled by an intake valve 515. The piston 300 (e.g., piston head 330) can define an inter-stage fluid path 520 fluidly connecting the first stage 410 and the second stage 420, wherein fluid flow through the inter-stage fluid path 520 can be controlled by an inter-stage valve 525. In a specific example, the inter-stage fluid path 520 can extend through the piston head thickness and extend radially along the back of the piston head 330 beyond the outer diameter of the piston rod 340 to fluidly connect to the second stage 420. The cylinder 200 can define an exhaust fluid path 530 (e.g., proximal the second end of the cylinder or top dead center and fluidly connected to the second stage 420), wherein fluid flow through the exhaust path can be controlled by an exhaust valve. In specific examples, the pump can include a single inlet and a single outlet (e.g., exhaust). In examples, the exhaust fluid path 530 can be fluidly connected to a pressurized reservoir, wherein the reservoir, in turn, can be fluidly connected to a tire or other pressurization endpoint.

In this illustrative example, working fluid can be drawn into the system S100 by the backwards stroke of the piston 300, which increases the volume of the first stage 410 and creates a negative pressure gradient between the ambient working fluid and the first stage 410. The working fluid within the first stage 410 can be pressurized S200 by a forward piston stroke when the intake valve 515 is closed and forced into a second stage 420 when the inter-stage valve 525 opens S300 (e.g., when the pressure within the first stage exceeds the pressure within the second stage by a threshold amount, when the cracking pressure of the inter-stage valve 525 is met or exceeded). The working fluid at the first pressure within the second stage 420 can then be pressurized from the first pressure to a second pressure S400 and optionally exhausted out the exhaust fluid path 530 S500 during the next piston backward stroke, while the working fluid is being drawn into the first stage for the subsequent cycle S100. Thus, fluid flow into the first stage for a subsequent cycle can occur contemporaneously with working fluid pressurization and/or exhaustion in the second stage for a prior cycle.

However, the system can be otherwise configured.

2. Technical Advantages

Variants of the technology can confer one or more advantages over conventional technologies.

First, variants of the pump 1000 can be more efficient than conventional pumps by pressurizing the working fluid during both the forward and backward strokes, where working fluid pressurized to a first pressure in the first stage 410, then pressurized to a second pressure in the second stage 420. Dual pressurization enables the pump 1000 to pressurize working fluid to a given target pressure with a lower piston thrust, as each of the two stages is responsible for pressurizing working fluid to only part of the pressure differential between ambient working fluid and target pressure rather than the entire pressure difference. Additionally, the force mechanism 100 (e.g., an eccentric mass, a motor, etc.) can be made smaller or less powerful while still achieving the same pressure difference as a system with one stage. In an example, the eccentric mass (e.g., hanging mass, offset mass, etc.) for a pump powered by relative rotation of the eccentric mass and wheel can have lower mass. In a second example, for an actively driven pump, less input energy is required to achieve the same pressure difference, which can save energy and reduce wear on pump components. Alternatively or additionally, the overall pressure delta across both stages can be higher for a system with a given piston thrust force compared to a similar piston pressurizing only one stage. This enables the pump 1000 to be used in applications requiring a higher pressure.

Second, variants of the pump 1000 can be modular as opposed to being integrated with the wheel or housing, as both stages are contained within the pump. When used in wheel-end tire inflation applications, this enables the pump to attach to a wide variety of wheel types with little or no modification. Furthermore, the pump's modularity and self-contained construction enables easy replacement and repair. Pumps can be replaced without replacing the entire housing, pumps can be swapped between wheels, pumps can be tested independently outside of the housing, and more types of tires can be inflated by the system.

Third, variants of the pump 1000 can be more compact, as the two-stage design enables a physically smaller pump. This makes the system more lightweight, thus reducing the energy expended by the vehicle to carry the system and reduces wear on the wheel the system is attached to.

Figure 2:
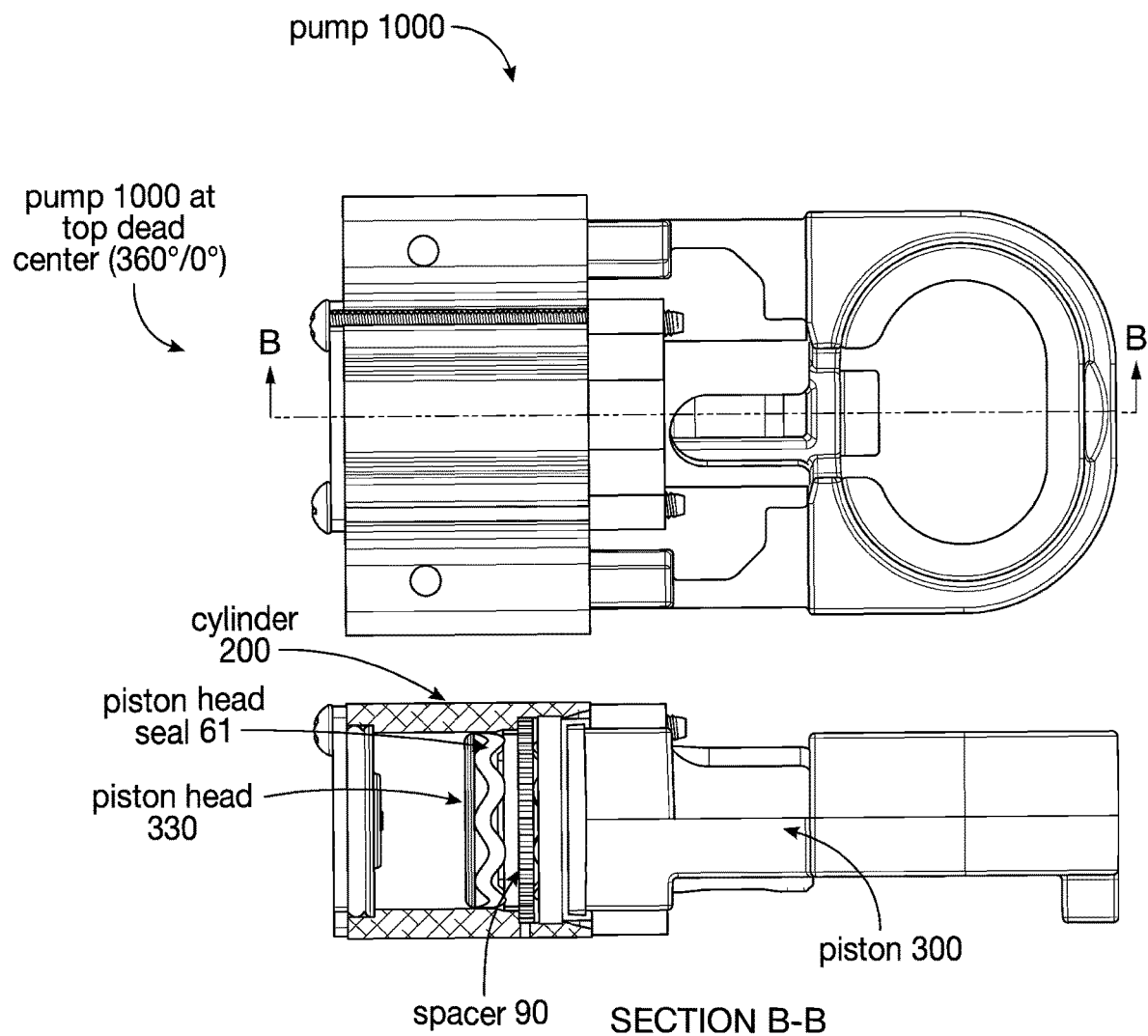
FIG. 2 is a broken-out section view of a variant of the pump.
Figure 3:
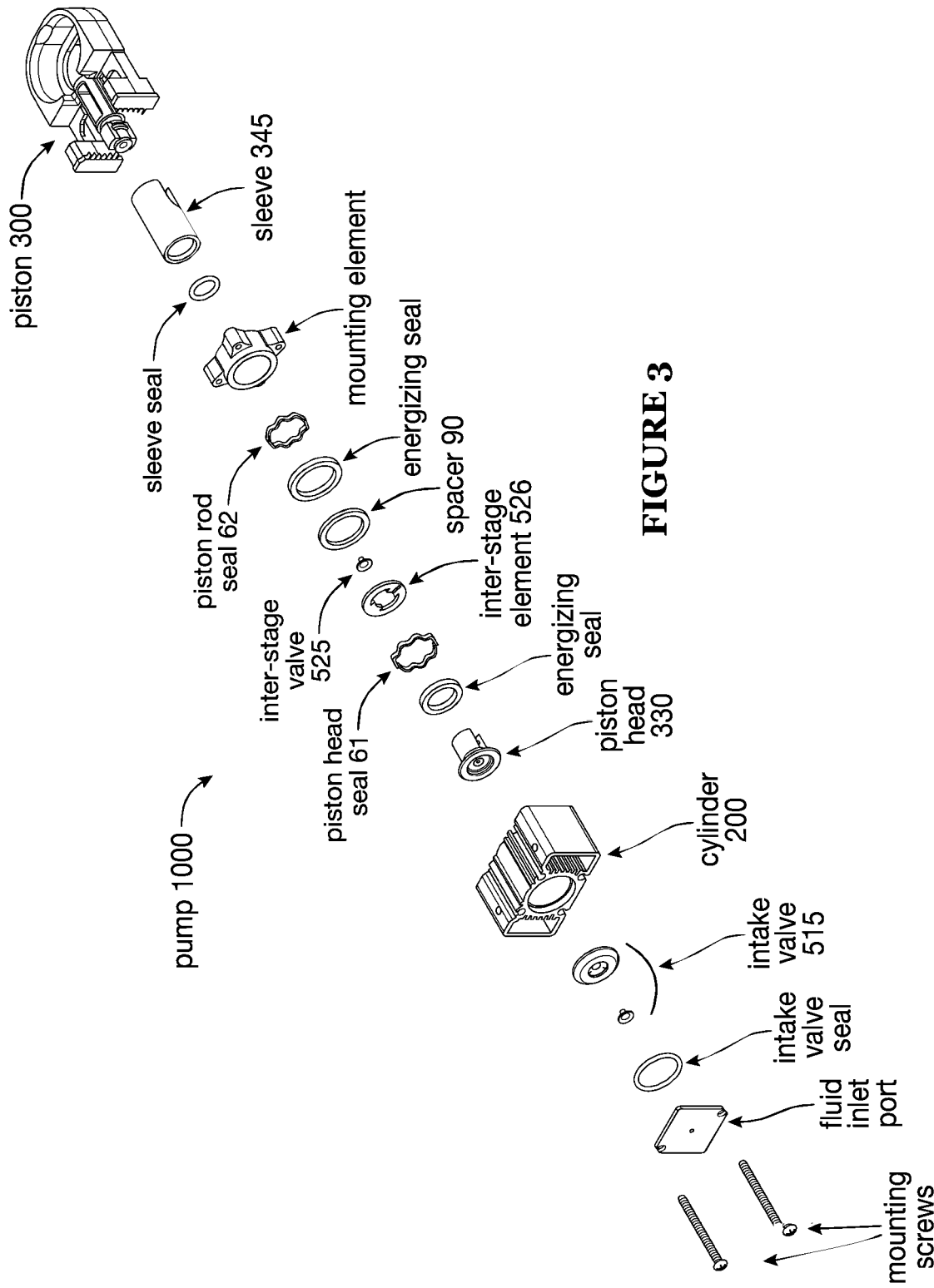
FIG. 3 is an exploded view of a variant of the pump.
Figure 14:
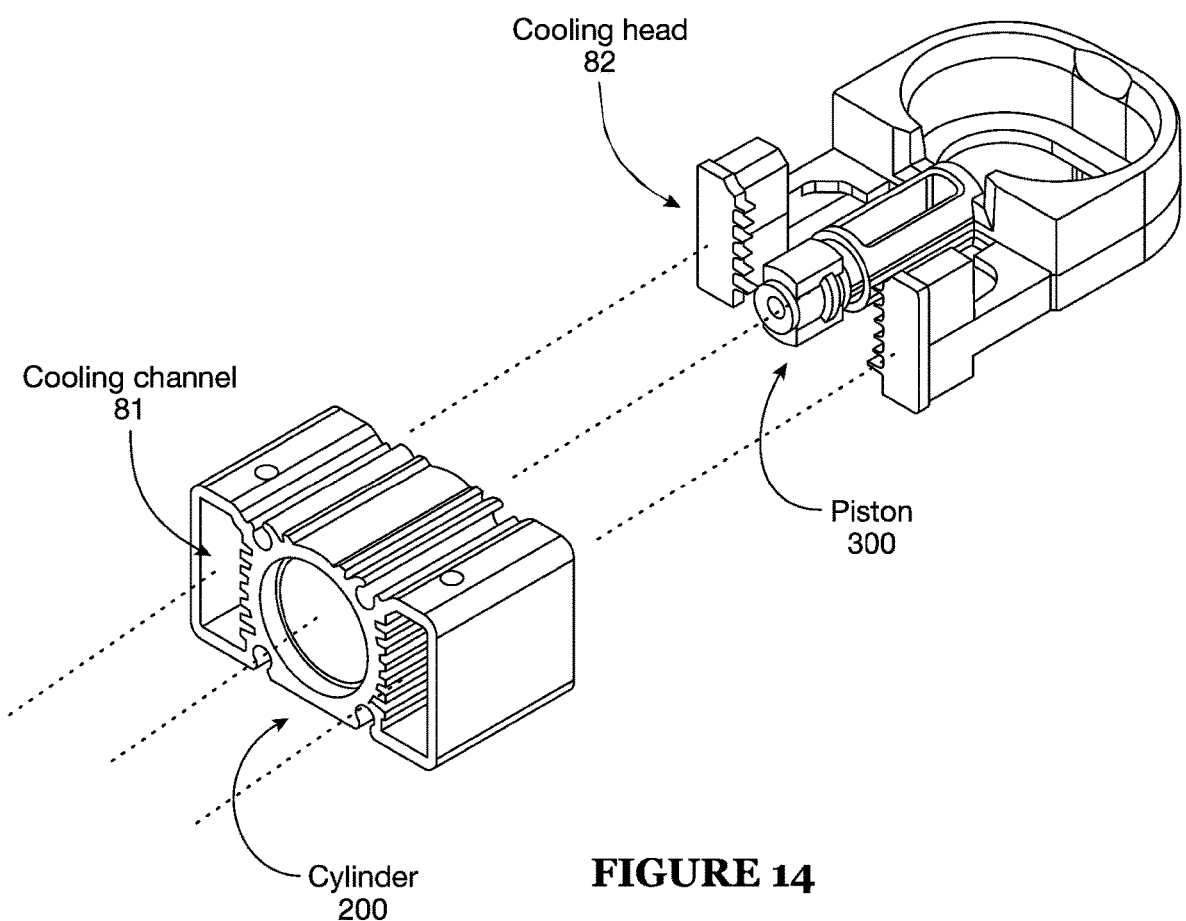
FIG. 14 is a schematic representation of an example of a cooling system.
Figure 15:
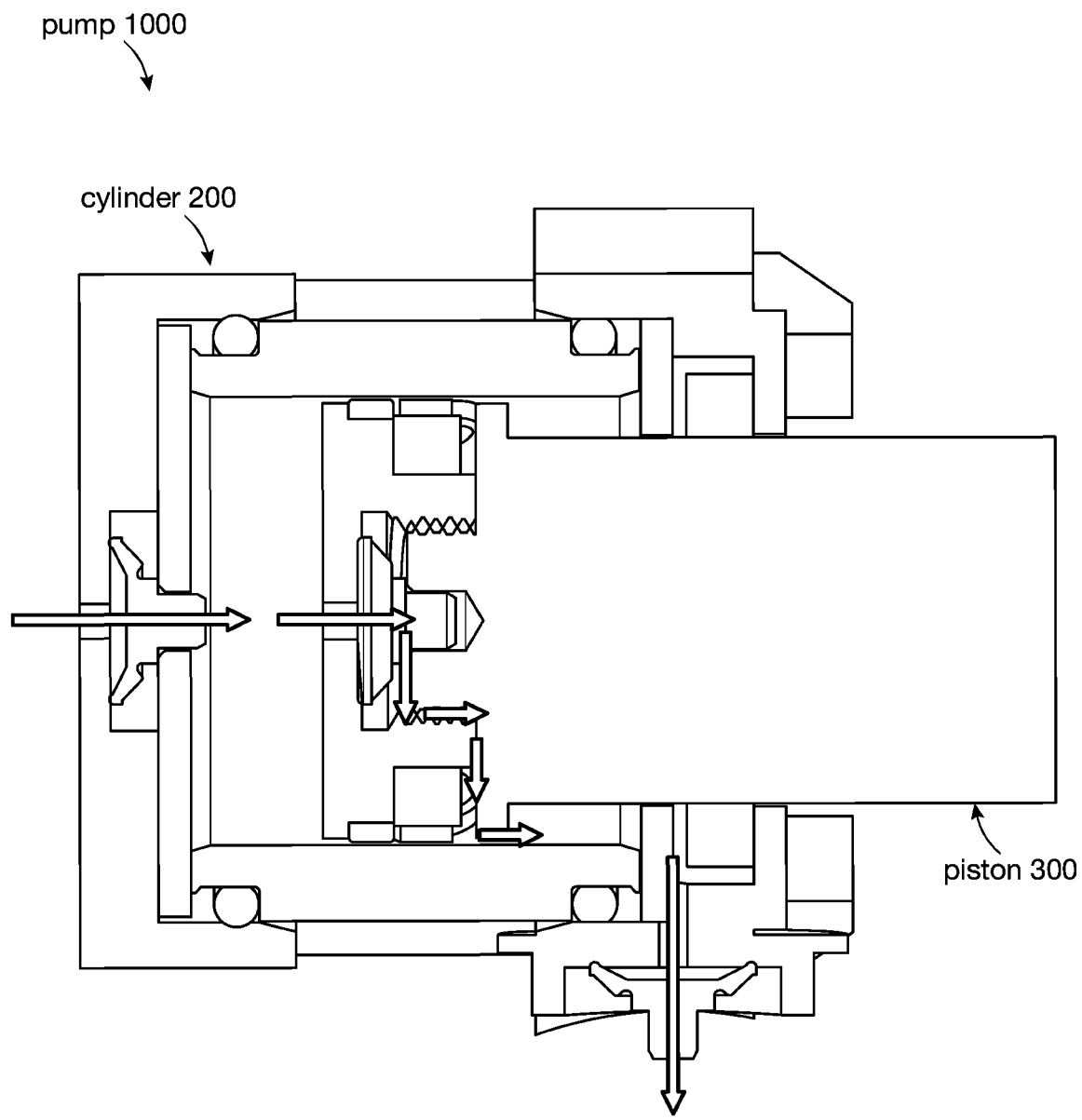
FIG. 15 is an illustrative example of working fluid flow through the system.

Fourth, variants of the pump 1000 can contain multiple features which extend the life of pump components. For example, the usage of wave seals instead of conventional O-rings between the piston 300 and cylinder 200 can extend the lifetime of the system's seals (e.g., as shown in FIG. 2). In another example, a pump cooling system can limit wear due to thermal expansion of parts, by preventing the system from overheating during use. In an illustrative example, the pump can include a set of cooling channels 81 extending along the length of the cylinder sides, and the piston can be statically attached to a set of cooling heads 82 that fit and actuate within the cooling channels 81 (e.g., example shown in FIG. 14). Piston 300 actuation within the cylinder 200 can also actuate the cooling heads 82 within the cooling channels 81, which draws cool air into and forces hot air out of the cooling channels 81 during the backwards and forwards strokes, respectively. In another example, a piston sleeve 345 (e.g., an aluminum piston sleeve 345) covering the piston rod 340 (e.g., a plastic piston rod 340) can extend the lifetime of the piston rod 340 by providing a longer-lasting sealing surface against a piston rod seal 62 at the cylinder shoulder.

Fifth, the system can be operated passively. For example, the force mechanism 100 can be an eccentric mass that converts relative motion between the eccentric mass and a rotary component (e.g., a wheel) into an actuation force (e.g., via a cam, scotch yoke, or other rotary-to-linear interface). This eliminates the need for a battery, which could be a potential source of failure, could add additional mass to the system, and could occupy space which could otherwise contain a larger pump or eccentric mass. Passive operation of the system can enable the pump 1000 to operate equally efficiently on the right or left side of the vehicle (e.g., where the eccentric mass spins clockwise or counterclockwise) and can enable easy switching of pumps between different wheels.

However, further advantages can be provided by the system and method disclosed herein.

3. System

In variants, the pump 1000 can include a piston 300 and a cylinder 200 cooperatively defining a first stage 410 in front of the piston 300 and a second stage 420 behind the piston 300 (e.g., examples shown in FIG. 1, FIG. 3, FIG. 11, FIGS. 12A-12G, and FIG. 15). The pump 1000 can function as a two-stage pump and pressurizes working fluid to a target pressure using both the forward and backward strokes of the piston 300.

Tire Inflation System.

The pump 1000 can be used in a tire inflation system (e.g., a wheel-and tire inflation system), in a fluid transfer system, and/or in any other suitable application. In variants, the tire inflation system can include a housing 10, a force mechanism 100, an optional reservoir fluidly connected to the pump, and the pump 1000; but the tire inflation system can additionally or alternatively include other components. The tire inflation system functions to inflate and/or maintain the pressure of a working fluid within a tire.

In examples, the tire inflation system can include components from the tire inflation system(s) described in: U.S. application Ser. No. 13/188,400 filed 21 Jul. 2011, U.S. application Ser. No. 13/187,949 filed 21 Jul. 2011, U.S. application Ser. No. 13/797,811 filed 12 Mar. 2013, U.S. application Ser. No. 13/797,826 filed 12 Mar. 2013, U.S. application Ser. No. 13/797,846 filed 12 Mar. 2013, U.S. application Ser. No. 14/204,674 filed 11 Mar. 2014, U.S. application Ser. No. 15/280,737 filed 29 Sep. 2016, U.S. application Ser. No. 15/696,816 filed 6 Sep. 2017, U.S. application Ser. No. 17/061,313 filed 1 Oct. 2020, and U.S. application Ser. No. 17/085,010 filed 30 Oct. 2020, each of which is incorporated in its entirety by this reference, and/or other tire inflation systems.

The working fluid used by the tire inflation system to pressurize the tire can be air (e.g., ambient air), treated air, a pure gas (e.g., nitrogen, $CO_2$, oxygen), a gaseous mixture, water, and/or any other suitable fluid.

The tire inflation system can be configured to fluidly connect to, and in some variants, mount to, a wheel with a tire. In these variants, the tire inflation system can inflate and/or maintain the tire pressure of the tire and/or perform other functionalities.

The tire is preferably an inflatable tire but can alternatively be any other suitable tire. The tire is preferably mounted to the wheel but can be otherwise coupled to a vehicle. The wheel functions to support the tire and the vehicle but can perform other functionalities. The wheel can be attached to any vehicle type (e.g., truck, car, airplane, bus, etc.). The wheel can be on the left side of a vehicle or the right side of a vehicle. The wheel can be a wheel on a steering axle or a driving axle. In variants, the wheel can be part of a single wheel or dual wheel setup (e.g., two wheels attached to either side of the axle instead of only one wheel). In a first example, a single tire inflation system can be attached to both wheels. In a second example, a tire inflation system can be attached to each wheel. However, tire inflation systems can be attached to any wheel or set of wheels.

The tire inflation system can be mounted to the wheel end (e.g., to the wheel hub, mounted coaxially with the wheel, mounted overlapping the wheel's axis of rotation, etc.), mounted to an arcuate segment of the wheel, mounted to a centralized location on the vehicle, and/or mounted to any other suitable portion of the vehicle. A tire inflation system can inflate one or more tires (e.g., on the same wheel end, different wheel ends, same axle, different axles, etc.).

The tire inflation system can pressurize and/or retain working fluid at 10 psig, 40 psig, 80 psig, 130 psig 145 psig, 180 psig, any pressure range bounded by the aforementioned values, more than 180 psig, less than 10 psig, and/or any other suitable pressure. The tire inflation system can weigh 0.5 kg, 1 kg, 2 kg, 2.8 kg, 4 kg, 8 kg, 10 kg, any weight range bounded by the aforementioned values, more than 10 kg, less than 0.5 kg, and/or any other suitable weight.

The housing 10 of the tire inflation system functions to mount and encapsulate components of the tire inflation system, mount the tire inflation system to the wheel, and/or perform other functionalities. The housing 10 is preferably statically mounted to the wheel but can alternatively be rotatably mounted to the wheel. The housing center of mass can be substantially aligned with the wheel center of mass or otherwise arranged. The housing center of rotation can be substantially aligned with the wheel center of rotation or be otherwise arranged. The housing 10 can be removably or permanently mounted to the wheel. In examples, the housing can be mounted to the wheel by a bracket, be bolted to the wheel hub, be integrated into the wheel hub, be integrated into the wheel axle, and/or be otherwise mounted to the wheel. In a specific example, the housing 10 can statically mount a component of the pump 1000 (e.g., the piston 300 or the cylinder 200) and rotatably mount the force mechanism (e.g., rotatably mount the eccentric mass), wherein the force mechanism can be mechanically connected to the actuating component of the pump (e.g., the pump component not statically mounted to the housing). The housing can be thermally conductive (e.g., function as a heat sink), thermally insulative, include membranes (e.g., water-permeable membranes, etc.), include filters (e.g., particulate filters, water filters, etc.), include visual windows (e.g., optically connecting a housing exterior with a housing interior), and/or have any other suitable set of features. The housing 10 can additionally define inflation system features. For example, the housing can define fluid inlets (e.g., fluidly connected to the pump inlet), fluid outlets (e.g., fluidly connected to the pump exhaust and/or the tire), fluid paths (e.g., channels) between the pump and a fluid inlet or outlet, the pressurized reservoir, and/or any other suitable tire inflation system feature.

In examples, the housing diameter can be 3 in, 5 in, 6.7 in, 8 in, 10 in, 15 in, smaller than 3 in, larger than 15 in, within any open or closed range bounded by the aforementioned values, and/or any other suitable diameter. The housing height (e.g., the dimension in the direction of the wheel axis when mounted to the wheel) can be 1 in, 2 in, 3.5 in, 5 in, smaller than 1 in, larger than 5 in, within any open or closed range bounded by the aforementioned values, and/or any other suitable height.

The force mechanism 100 of the tire inflation system functions to provide the actuating force for the pump 1000. The force mechanism 100 can be mounted to the housing 10, to the wheel, and/or the vehicle body. The tire inflation system can include a single force mechanism 100 for each pump, multiple force mechanisms 100 for each pump, a force mechanism 100 for multiple pumps (e.g., wherein the pumps are arranged at different portions of the force mechanism actuation cycle), and/or any other suitable number of force mechanisms 100. The force mechanism can include an actuator interface 190 and/or other suitable components.

The force mechanism can be passive or active.

Figure 16A:
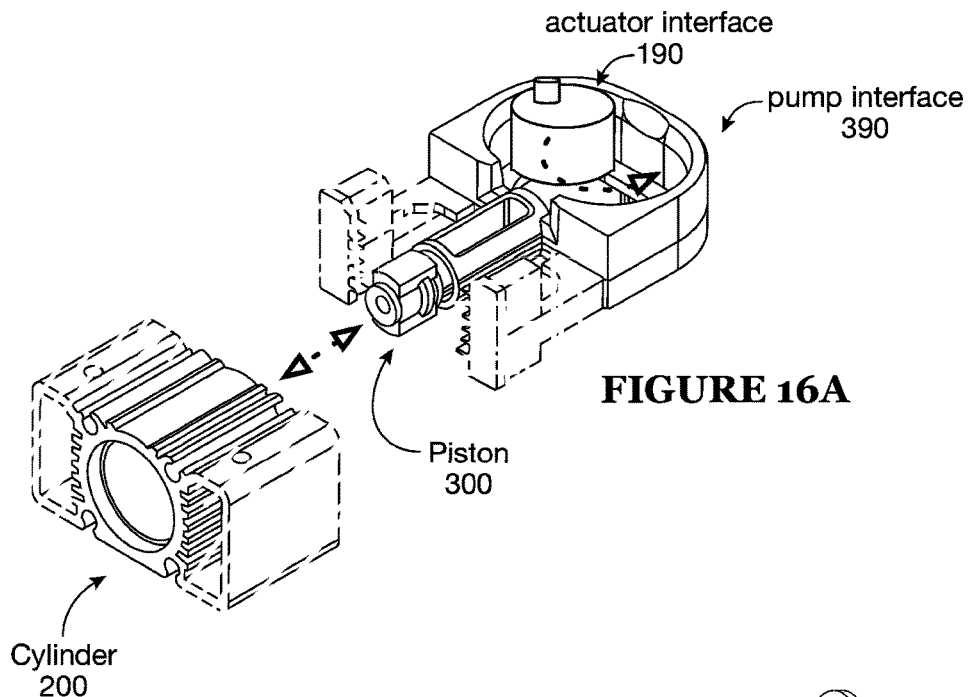
FIGS. 16A, 16B, and 16C are examples of the actuator interface interaction with the pump interface to drive the pump.
Figure 16B:
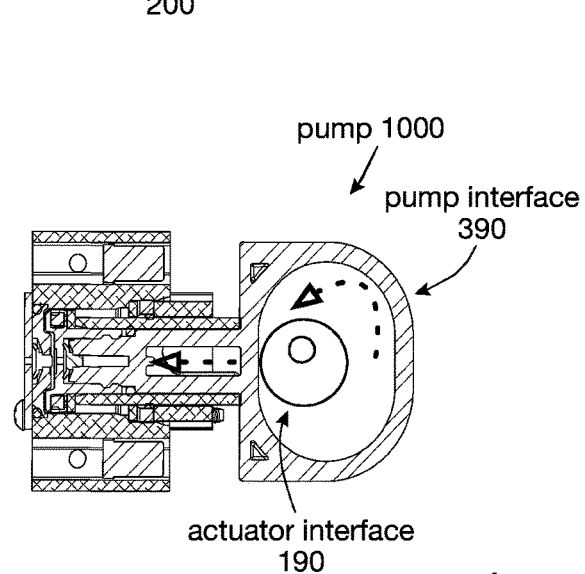
Figure 16C:
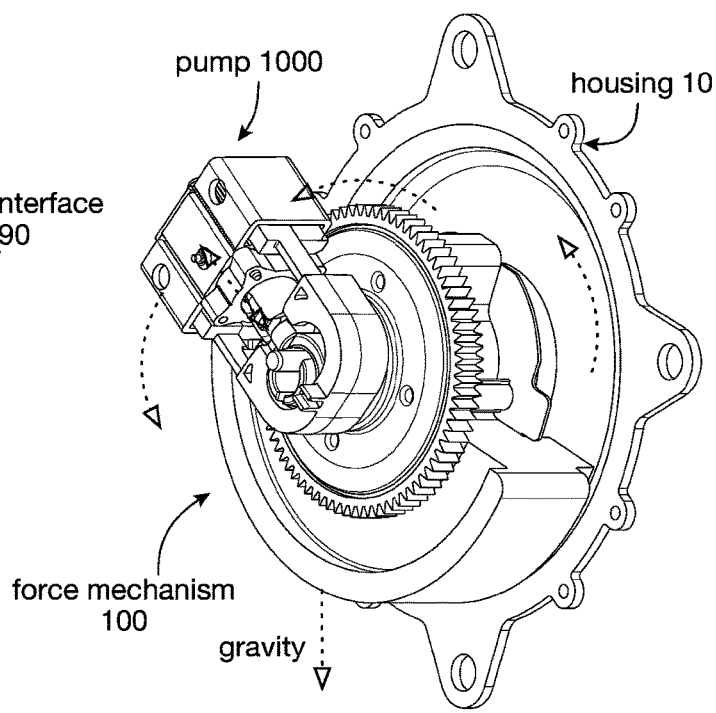

In a first variant, the force mechanism 100 is passive and converts relative motion between the force mechanism 100 and the wheel into the actuation force. In a first embodiment, the force mechanism 100 can include an eccentric mass (e.g., as shown in FIGS. 4A and 4B) rotatably attached to the housing 10, wherein the force mechanism 100 converts relative motion between the eccentric mass (e.g., hanging mass, mass offset from the wheel rotational axis, etc.) and the housing 10 into the actuating force. In a specific example, the eccentric mass can hang (e.g., remain within a threshold angle of the gravity vector) during wheel rotation, wherein a cam, rotor, or other actuator interface statically connected to the eccentric mass can rotate relative to a scotch yoke, channel, stator, or other pump interface statically connected to the pump, which rotates with the wheel. This relative rotation can cause the pump interface to reciprocate, thereby actuating the pump (e.g., examples shown in FIGS. 16A, 16B, and 16C). The eccentric mass can be formed from one or more pieces, which can be selectively attached and/or detached by an actuation mechanism, radial forces, arcuate forces, magnetic forces, and/or other mechanisms. In a second embodiment, the force mechanism 100 can include a rotor and/or stator, where one component (e.g., the rotor or stator) can be attached to the axle and the other component can be attached to the wheel. However, the rotor and/or stator can be otherwise configured. However, another passive force mechanism can be used.

In a second variant, the force mechanism 100 is active. In this variant, the force mechanism can include a motor or other powered actuator. Examples of active force mechanisms that can be used include: a linear motor, pneumatic cylinder, hydraulic cylinder, solenoid actuator, rotary motor (e.g., with a rotor and stator), a servomechanism, and/or any other suitable active mechanism.

However, other force mechanisms can be used.

The force mechanism 100 can additionally or alternatively include an actuator interface 190, which functions to connect the force mechanism 100 with the pump interface 390 and apply the actuation force generated by the force mechanism 100 to the pump 300. The actuation force can be a linear force, a rotational force (e.g., a torque), and/or any other suitable force. The actuation force can be applied: colinearly with the pump actuation axis (e.g., along the cylinder central axis); to a rotary-to-linear motion mechanism (e.g., a scotch yoke, cam and follower, split nut mechanism, rack and pinion mechanism, etc.), wherein the resultant linear force is applied to the piston; directly to the piston (e.g., wherein the piston is a rotary piston), and/or otherwise applied to the pump 1000.

The actuator interface 190 can be a bearing, bushing, pin, joint, flexing part, block, cam (e.g., in cam-and-follower, cam in scotch yoke), slider (e.g., in a crank-and-slider), and/or any other type of interface.

Figure 5A:
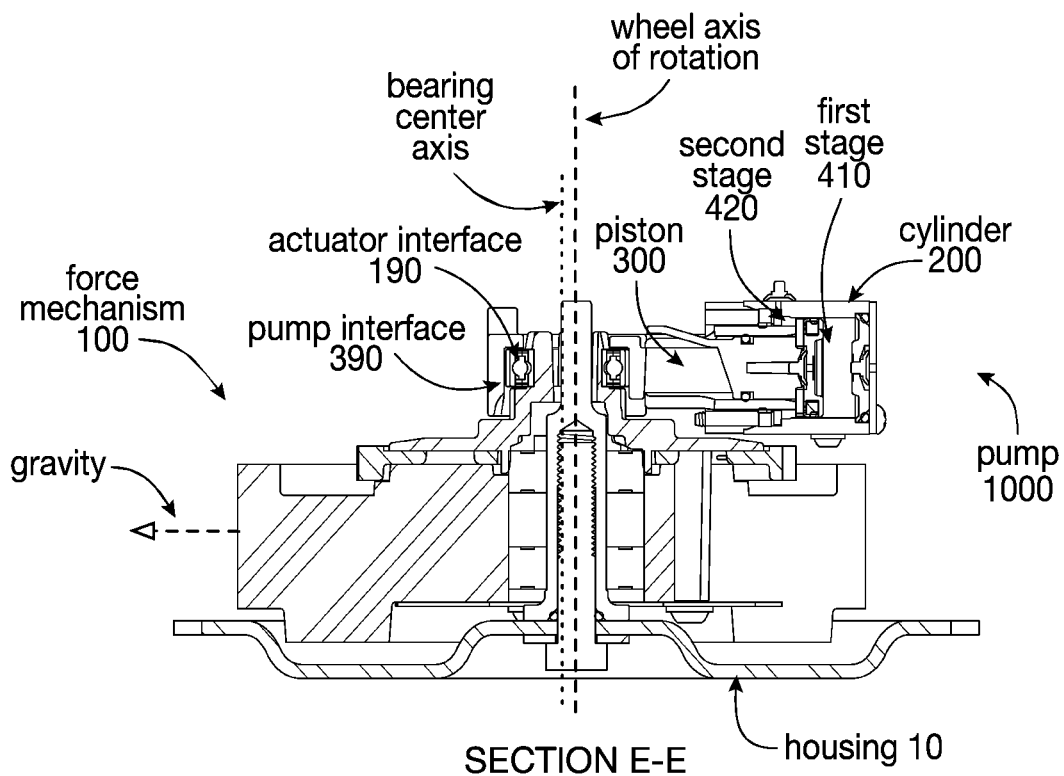
FIGS. 5A and 5B are a cross-sectional view of a variant of the pump-eccentric mass assembly and an isometric view of a variant of the pump-eccentric mass assembly, respectively.
Figure 5B:
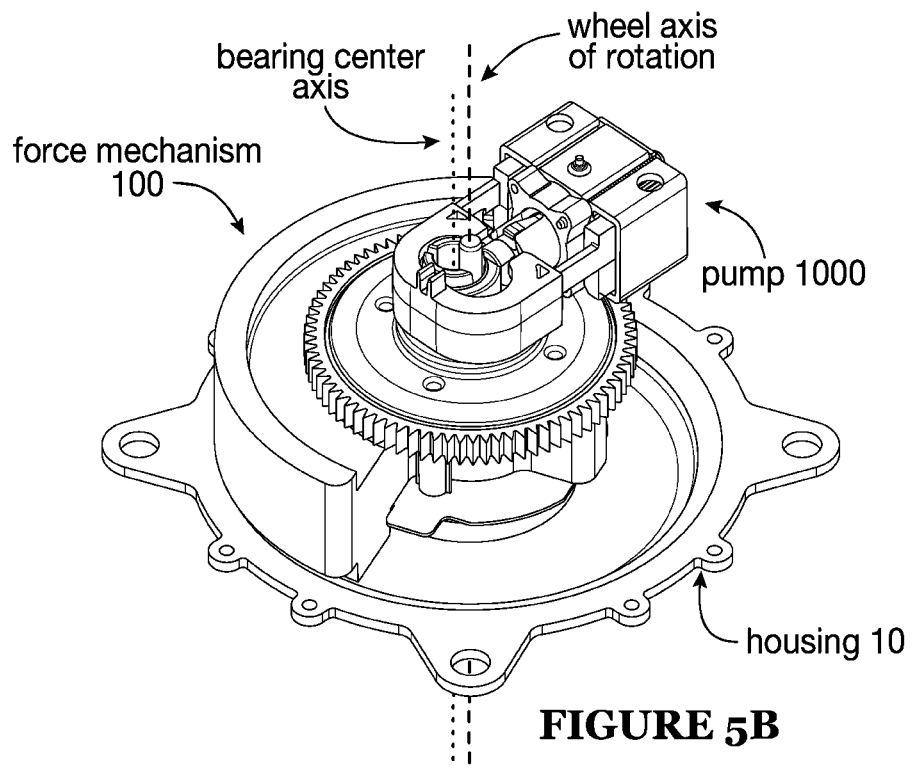

The actuator interface 190 can be mounted to the force mechanism 100, to the housing 10, and/or to any other suitable component. In a variant, the actuator interface 190 is statically mounted to the force mechanism 100. In an example of this variant, the actuator interface 190 is statically mounted to the eccentric mass's axis of rotation (e.g., where the force mechanism 100 is an eccentric mass). In a second example of this variant, the actuator interface 190 can be mounted to an actuating end of a linear actuator (e.g., where the force mechanism 100 is a linear actuator). In a second variant, the actuator interface 190 can rotate relative to the force mechanism 100. In an example of this variant, the actuator interface 190 is a bearing with an outer surface rotating relative to the eccentric mass connected to the bearing inner surface (e.g., example shown in FIGS. 5A and 5B). In a second example of this variant, the actuator interface 190 is a pin rotationally fixed or not fixed relative to the eccentric mass. However, the actuator interface 190 can be otherwise mounted to the force mechanism 100.

The actuator interface 190 can be mounted at the wheel axis of rotation, mounted at the housing axis of rotation, mounted offset to the wheel axis of rotation, mounted offset to the housing axis of rotation or can be otherwise located. The actuator interface location can be fixed relative to the wheel axis of rotation or move relative to the wheel axis of rotation. In an example, the actuator interface 190 can move back and forth across the wheel axis of rotation. In a second example, the actuator interface 190 can circle the wheel axis of rotation. The actuator can otherwise move or not move relative to the wheel axis of rotation. However, the actuator interface can be otherwise mounted.

The actuator interface 190 can be connected to the pump 1000 via a pump interface 390 located on the pump or be otherwise connected to the pump.

The actuator interface 190 can move in the direction of the actuating force, can move in a direction acute with the direction of the actuating force, move in a direction obtuse with the actuating force direction, or move in any other suitable direction relative to the actuating force. In an example where gravity generates the actuating force, the actuator interface 190 can move toward the lowest point of a pump interface 390. In a specific example, the actuator interface 190 can include a bearing, acting as a cam, that sits within a scotch yoke piston interface within the piston 300 of the pump 1000 (e.g., example shown in FIG. 16B), wherein the cylinder 200 of the pump 1000 is statically mounted to the housing 10 and rotates with the wheel. In this embodiment, gravity acting on an eccentric mass (e.g., example shown in FIG. 16C) generates the actuating force and the actuator interface 190 exerts the actuating force on the pump interface 390. Wheel rotation relative to the eccentric mass and actuator interface 190 (e.g., the bearing) can cause the actuator interface 190 to translate along and apply an actuating force to the inside of the scotch yoke, wherein the non-circular geometry of the scotch yoke causes the piston 300 to reciprocate between the forward and backward stroke throughout wheel rotation. However, the actuator interface can otherwise move relative to the actuating force.

The optional reservoir of the tire inflation system functions to contain pressurized working fluid that can be used to inflate a tire or a set of tires. The system can preferably include one reservoir per housing 10, but can alternatively include one reservoir per wheel, one reservoir per wheelset, one reservoir per pump, and/or multiple reservoirs connected in parallel or in series. The reservoir internal pressure is preferably higher than the pressure in the tire interior but can alternatively be the same pressure or lower pressure than the tire interior. In a variant where the reservoir pressure is lower than the pressure in the tire, an additional pump or set of pumps can further pressurize working fluid between the reservoir and the tire. The reservoir can optionally include working fluid treatment systems (e.g., a heating/cooling system, a water purging system, water removal system, etc.). The reservoir can additionally include a non-tire outlet (e.g., an overflow valve). The reservoir can be defined by or mounted to the housing 10, pump 1000, the wheel, the vehicle, and/or any other suitable component. The reservoir can be fluidly connected to: the pump outlet, the pump inlet, the first stage, the second stage, and/or any other suitable portion of the pump. In an example, the reservoir (e.g., working fluid sink) is directly connected to the pump outlet and the tire inlet. In a second example, the reservoir (e.g., working fluid source) is only directly connected to the pump inlet. The reservoir can be: a volume defined by the housing, a volume separate from the housing, the tire, and/or any other suitable fluid volume. However, the reservoir can be otherwise configured.

The tire inflation system can optionally include a tire valve which functions to control working fluid flow between the reservoir and the tire. The tire valve can be preferably active but can alternatively be passive. The tire valve operates based on a command from a tire inflation system controller (e.g., onboard the tire inflation system, remote from the tire inflation system, etc.), but can additionally or alternatively open when the tire pressure differential falls below a threshold pressure differential (e.g., tire valve cracking pressure), when a measured tire pressure (e.g., measured by a set of TPMS sensors) falls below a threshold, responsive to a user command, and/or responsive to occurrence of any other suitable event. The tire valve can be located within the reservoir, at the edge of the reservoir, in a tube connecting the reservoir to the tire, and/or another suitable location. The system can include one tire valve per reservoir, two tire valves per reservoir (e.g., for a dual-wheel wheel-end unit), one tire valve for multiple reservoirs, or no tire valves. The tire valve can control reservoir working fluid intake (e.g., one valve controls working fluid inflow and exhaust) or can be separate from the reservoir working fluid intake path. However, the tire valve can be otherwise located.

The tire inflation system can optionally include a power source. Examples of power sources that can be used include: primary batteries, secondary batteries, generators (e.g., driven by the force mechanism, separate from the force mechanism, etc.), and/or any other suitable power source. The power source can power any of: a pump 1000, a set of sensors, a heating/cooling system, a water management system, a processing system, and/or any other suitable electrically powered system.

The tire inflation system can optionally include a set of sensors, which function to monitor tire inflation system operation. Examples of sensors that can be used include: pressure sensors, temperature sensors, humidity sensors, kinematic sensors (e.g., accelerometers, gyroscopes, etc.), rotational encoders, and/or any other suitable set of sensors.

The sensors can monitor: force mechanism operation, pump operation, reservoir state, wheel state, and/or any other suitable parameter.

The tire inflation system can also include the pump 1000, as discussed further below. A tire inflation system can include one or more pumps. When the tire inflation system includes multiple pumps, the pumps can be evenly or unevenly arcuately distributed about the wheel rotation axis. The multiple pumps can be attached to and driven by the same force mechanism 100 or different force mechanisms. However, the pumps can be otherwise configured within the tire inflation system.

However, the tire inflation system can be otherwise configured.

Pump.

The pump 1000 functions to pressurize working fluid to a target pressure. The target pressure can be the tire pressure, a pressure higher or lower than target tire pressure, a pressure higher or lower than current tire pressure, and/or another suitable pressure.

The pump 1000 preferably defines two or more pressurization stages but can alternatively define only one pressurization stage. The pressurization stages are preferably connected in series, but can alternatively be connected in parallel, be fluidly isolated, and/or be otherwise related. In variants where the pump defines at least two serially connected pressurization stages, successive stages can incrementally pressurize the working fluid, such that a successive stage's exhaust working fluid pressure is higher than the prior stage's exhaust working fluid pressure. However, the different stages can pressurize the working fluid to the same pressure or to any other suitable pressure.

The pump 1000 is preferably a positive displacement piston pump but can alternatively be a reciprocating pump, rotary pump, diaphragm pump, and/or any other suitable pump type. The pump can be a two-stroke pump, four-stroke pump, dual-acting pump, single-stroke pump, triplex pump, and/or any other suitable pump type. The pump 1000 preferably pressurizes working fluid during both the forward and backward stroke but can alternatively pressurize working fluid during only one of the two strokes.

The overall pump volume can be static or adjustable (e.g., to adjust pressure change). The volume adjustment can also change the final pressures of individual stages within the fluid path. In a first variant, volume adjustment can be the screwing of a cylinder cap. In a second variant, volume adjustment can be changing the piston rod length. In a third variant, volume adjustment can be changing the height or other dimensions of the piston head 330. In a fourth variant, volume adjustment can be physical inserts taking up space within one or both stages. In a fifth variant, volume adjustment can be adjusting cylinder 200 mounting position on the housing 10 (e.g., relative to the housing 10, relative to the actuator interface 190, relative to the force mechanism 100 etc.). In a sixth variant, volume adjustment can be changing the axial position of the cylinder shoulder. However, volume adjustment can be otherwise performed.

Adjustments to the pump volume can be implemented using an interface accessible outside of the pump 1000 or housing 10 (e.g., a slider, knob, virtual interface (e.g., where the volume is automatically set based on a setting received from the virtual interface, etc.), and/or using another suitable interface All or a portion of components of the pump 1000 can be made of aluminum, steel, rubber, plastic, iron, or any other suitable material. All or a portion of components of the pump can be manufactured through additive or subtractive processes, including machining, injection molding, casting, and/or any other suitable process. All or a portion of components of the pump can be made of multiple parts joined together via welding, joints, screws, adhesive, press fits, and/or any other suitable form of joining. Alternatively components can be manufactured as a unitary component. However, components of the pump can be otherwise manufactured.

In specific examples, the pump 1000 can operate at −80° C., −50° C., −40° C., −10° C., 80° C., 100° C., 120° C., 160° C., 200° C., within any open or closed range bounded by the aforementioned values, below −80° C., above 200° C., and/or at any suitable operating temperature.

Figure 10:
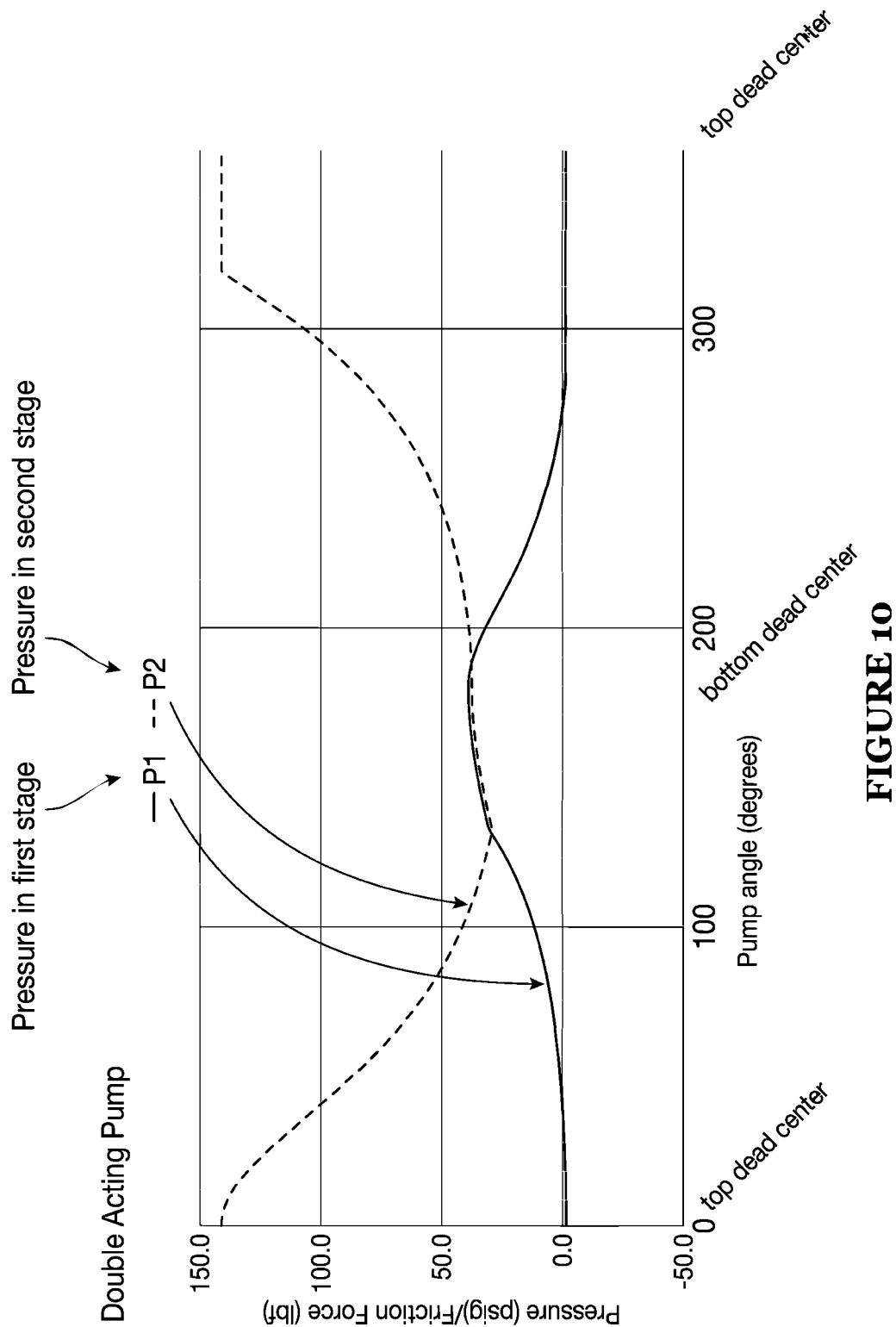
FIG. 10 is a graph depicting pressures in the first and second stages over a stroke cycle in a variant of the method.
Figure 11:
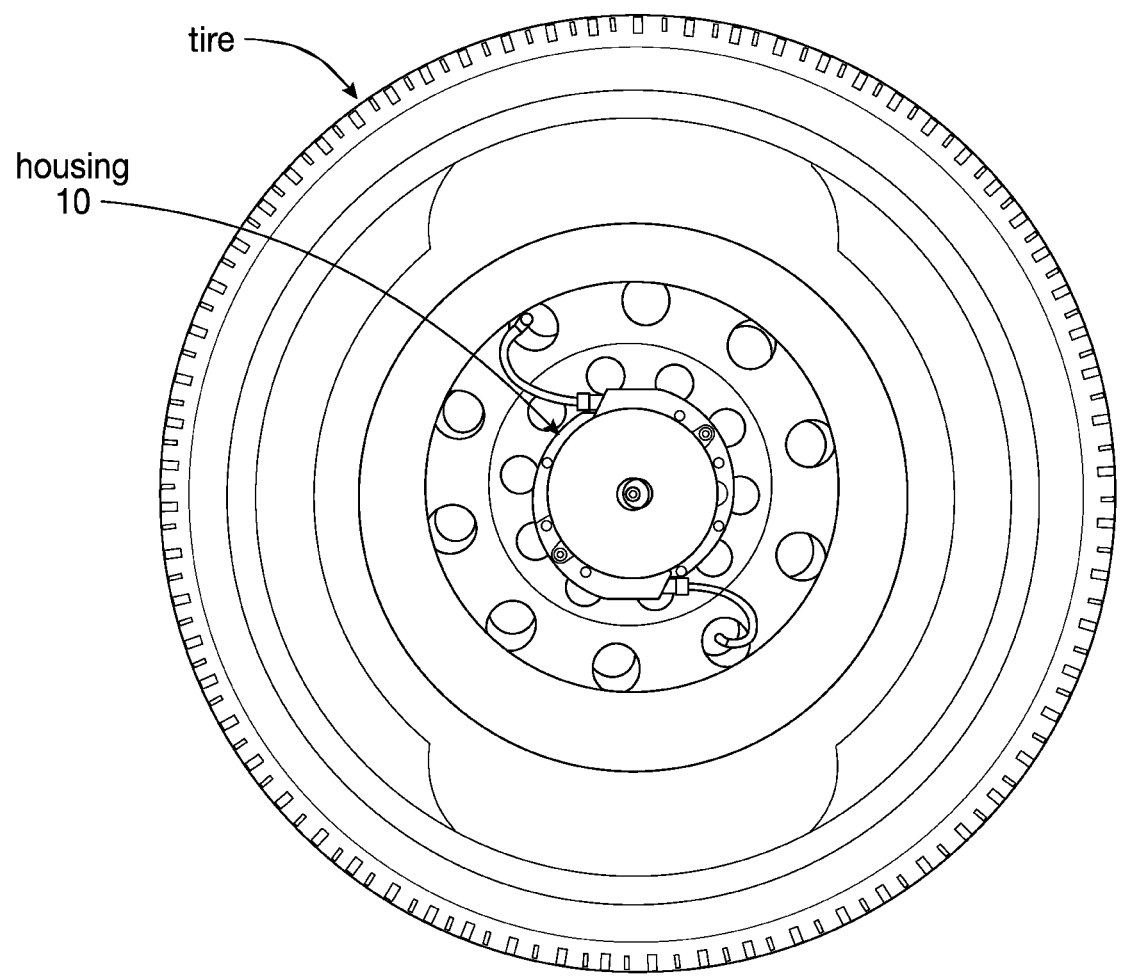
FIG. 11 is an image of a variant of the housing mounted to a wheel.
Figure 12A:
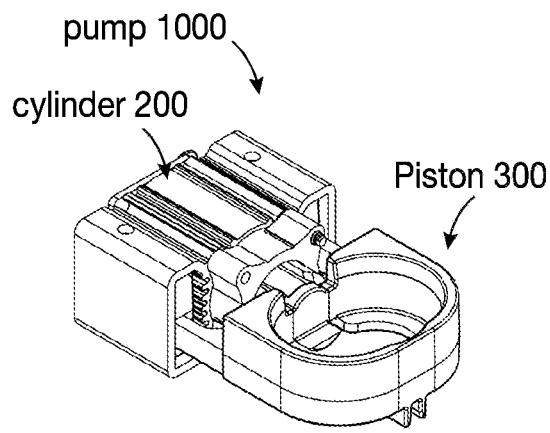
FIGS. 12A, 12B, 12C, 12D, 12E, 12F, and 12G are an isometric front top right view, isometric front bottom right view, top plan view, bottom plan view, back elevation view, front elevation view, and side elevation view of an example of the pump, respectively.
Figure 12B:
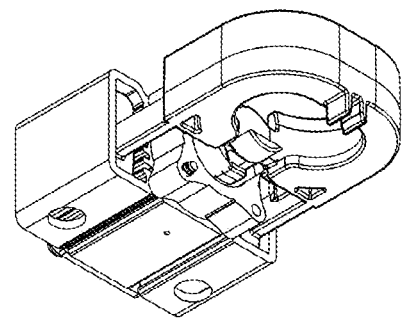
Figure 12C:
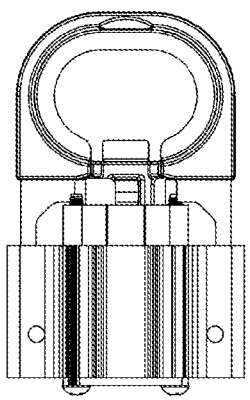
Figure 12D:
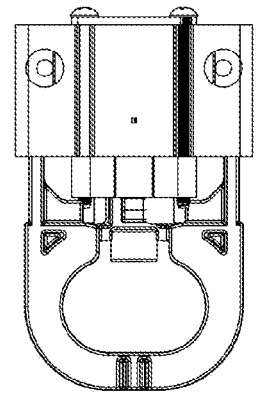
Figure 12E:
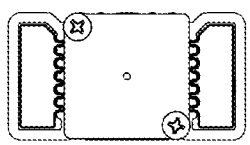
Figure 12F:
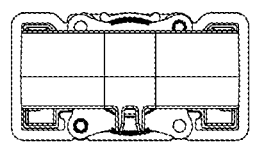
Figure 12G:
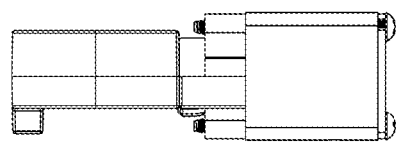

The first stage maximum pressure can be 0 psig, 10 psig, 20 psig, 28 psig, 40 psig, 55 psig, 100 psig, within any open or closed range bounded by the aforementioned values, above 100 psig, and/or any other suitable target pressure (e.g., as shown in FIG. 10).

The second stage maximum pressure can be 0 psig, 60 psig, 70 psig, 80 psig, 100 psig, 145 psig, 160 psig, above 160 psig, above the tire pressure, below the tire pressure, within any open or closed range bounded by the aforementioned values, and/or any other suitable target pressure (e.g., as shown in FIG. 10).

The maximum pressure of the pump and/or the first or second stages can be static or adjustable. In examples, the pump pressure (e.g., pump setpoint) can be adjusted by: changing the stroke length in the first or second stage, changing the size (e.g., diameter, length, etc.) of the cylinder (e.g., in the first stage, the second stage, or both), changing the cracking pressure or opening pressure of the valves (e.g., inter-stage flow valve, exhaust valve, etc.), and/or otherwise adjusting the pump pressure setpoints.

Tire pressure can be 45 psig, 60 psig, 75 psig, 120 psig, 130 psig, 150 psig, 180 psig, above 180 psig, within any open or closed range bounded by the aforementioned values, and/or any other suitable target pressure.

Pump mass can be 0.08 lbs, 0.12 lbs, 0.17 lbs, 0.3 lbs, 0.5 lbs, below 0.08 lbs, above 0.5 lbs, within any open or closed range bounded by the aforementioned values, and/or any other suitable mass.

The pump length (e.g., distance from first end of cylinder 200 to pump interface 390) can be 1.5 in, 2 in, 2.7 in, 4 in, 8 in, within any open or closed range bounded by the aforementioned values, smaller than 1.5 in, larger than 8 in, and/or any other suitable length.

The pump cylinder diameter can be 0.5 in, 0.75 in, 1 in, 2 in, within any open or closed range bounded by the aforementioned values, smaller than 0.5 in, larger than 2 in, and/or any other suitable cylinder diameter.

In an illustrative example, the pressurization rate at 60 mph for a 295/75/R22.5 tire can be 1 psi/hour, 2 psi/hour, 3 psi/hour, 4 psi/hour, 6 psi/hour, lower than 1 psi/hour, higher than 6 psi per hour, within any open or closed range bounded by the aforementioned values, and/or any other suitable pressurization rate.

The pump flow rate at 500 rpm at 80 psig outlet can be 200 sccm, 400 sccm, 500 sccm, 600 sccm, 800 sccm, lower than 200 sccm, higher than 800 sccm, within any open or closed range bounded by the aforementioned values, and/or any other suitable pump flow rate.

However, the pump can have any other suitable set of specifications.

The pump 1000 can be statically or movably mounted relative to the housing 10 and/or wheel. The pump 1000 can be mounted offset the housing 10 and/or wheel axis of rotation, wherein the radial position of the cylinder 200 can be determined based on the stroke length of the piston 300 (e.g., the actuator interface 190 when the piston 300 is fully retracted at top dead center), based on the target volume, based on the target pressure, and/or otherwise determined. The radial position of the cylinder 200 relative to the wheel center can be adjustable (e.g., to adjust stage volume, second stage target pressure, etc.) or static. Alternatively, the pump can be mounted at the housing 10 and/or wheel axis of rotation. The pump 1000 can be mounted directly to the housing, preferably to the housing interior but alternatively to the housing exterior. The pump can be mounted to the interior housing wall proximal or distal the wheel and/or along the housing outer circumference. However, the pump can be mounted to another suitable location.

The pump 1000 can be counterbalanced by a mass or set of masses (e.g., counterbalancing masses) radially opposing the pump 1000 across the axis of rotation. The weight(s) can be attached to the housing 10, wheel, tire, and/or any other suitable component. However, the pump can alternatively be not counterbalanced.

The pump 1000 can include a cylinder 200, piston 300, valves, seals, sensors, and/or other components. The pump 1000 can define an intake fluid path 510, a first stage 410, an inter-stage fluid path 520, a second stage 420, an exhaust fluid path 530, and/or other suitable pump components. The pump functions to pressurize working fluid to a target pressure. In examples, the pump can incrementally pressurize the working fluid using a set of serially-connected stages.

The cylinder 200 functions to house a reciprocating piston head 330 and can function to define the first and second stages. Each pump preferably includes a single cylinder but can additionally or alternatively include multiple cylinders.

The cylinder 200 can include a first end opposing a second end. The first end and second end can be coaxially aligned (e.g., along the cylinder longitudinal axis) or otherwise aligned. The first and second ends are preferably closed or sealed but can alternatively be open. The first end is preferably arranged distal (e.g., furthest away from) the force mechanism 100 and/or piston rod 340 but can additionally or alternatively be arranged proximal (e.g., closest to) the force mechanism and/or piston rod 340. The second end is preferably arranged proximal (e.g., closest to) the force mechanism 100 and/or piston rod 340 but can additionally or alternatively be arranged distal (e.g., furthest away from) the force mechanism 100 and/or piston rod 340. The first end preferably defines a fluid inlet (e.g., intake fluid path 510), but can additionally or alternatively define a fluid outlet (e.g., exhaust fluid path 530) or any other suitable fluid path. The second end preferably defines a fluid outlet (e.g., exhaust fluid path 530), but can additionally or alternatively define a fluid inlet (e.g., inlet fluid path 510) or any other suitable fluid path. In a specific example, the cylinder first end defines a fluid intake path through the center of the cylinder first end (e.g., along the cylinder center axis). However, the cylinder first and second ends can be otherwise configured.

The cylinder 200 is preferably cylindrical but can alternatively be rectilinear, hexagonal, irregular, and/or any other shape.

The cylinder 200 can have a uniform cross section between the first and second end but can alternatively have a varying cross section along the cylinder length. The cylinder body can preferably be aluminum but can alternatively be another metal, plastic, ceramic, or another suitable material. The cylinder body can be extruded, cast, machined, forged, or be created through any method or combination of methods. The cylinder 200 can be wholly or partially finished by any method, including sanding, powder coating, plating, painting, anodizing, and/or any other method.

The cylinder 200 can be made of one part or multiple parts. In an example, a cylinder 200 can include a cylinder body, end plate, and end cap fitting over the end plate and mounting the end plate to the body. The end plate and end cap can each include orifices that cooperatively form the intake fluid path 510, and the end plate and end cap can cooperatively trap the inlet valve aligned with the intake fluid path 510 therebetween. The cylinder 200 can have a shoulder at the second end, where the shoulder is a cylinder portion with a smaller diameter than the piston head at top dead center (e.g., at the cylinder second end). The shoulder can be connected or unconnected to the cylinder body. In a first variant, the shoulder is integrated with the cylinder body. In a second variant, the shoulder is formed by a spacer 90 (e.g., an annulus) placed into the cylinder 200. The spacer 90 can optionally be retained at the second end by a shoulder in the cylinder wall and/or a set of seals. In an example, the spacer 90 has a non-circular (e.g., wave, square wave, zig zag, etc.) outer perimeter to allow working fluid flow into a hole (e.g., an exhaust fluid path 530) in the cylinder wall. In a second example, the spacer 90 has a radial channel or set of radial channels facilitating radial working fluid flow. In variants, the shoulder can have any other suitable architecture. However, the cylinder can be otherwise configured.

The cylinder 200 is preferably statically mounted to the housing but can alternatively actuate relative to the housing. In the latter variant, the cylinder 200 can include a pump interface 390, wherein the pump interface 390 can be connected to the actuator interface 190. In a first example, the piston 300 is fixed to the housing 10 and/or wheel and the force mechanism 100 drives reciprocation of the cylinder 200 relative to the piston 300. In a second example, both the piston 300 and cylinder 200 are connected to an actuator interface 190 (e.g., the same or different actuator interface) and reciprocate opposite one another (e.g., the piston 300 and cylinder 200 reciprocate on opposing cycles) to drive pump actuation. However, the cylinder 200 can be otherwise located or mounted to the housing.

However, the cylinder 200 can be otherwise configured.

The piston 300 functions to pressurize working fluid and move working fluid through stages of the pump 1000. The piston 300 can include a piston head 330, piston rod 340, and a pump interface 390 and can additionally or alternatively include seals, a cooling piston, and/or other components. The piston 300 can preferably be plastic but can alternatively be aluminum, steel, iron, another suitable material, or a combination of suitable materials. The piston 300 can preferably be injection-molded but can be machined, 3D printed, or created through another suitable method. The piston 300 can be made of one part or more than one parts.

The piston 300 can operate between top dead center (TDC) and bottom dead center (BDC), where each state is the limit of piston motion within the cylinder 200 during a full stroke cycle. Top dead center can preferably be the location of the piston head 330 when the piston head 330 is closest to the cylinder second end (e.g., example shown in FIG. 1B) but can alternatively be the location of the piston head 330 when the piston head 330 is closest to the cylinder first end. Bottom dead center can preferably be the location of the piston head 330 when the piston head 330 is closest to the cylinder first end (e.g., examples shown in FIG. 1A, FIG. 13A, and FIG. 13B) but can alternatively be the location of the piston head 330 when the piston head 330 is closest to the cylinder second end.

The piston head 330 functions to cooperatively define the first and second stages with the cylinder 200. The piston head 330 can additionally function to pressurize the working fluid in each stage. The piston head 330 can define a front face and a back face, where the front face is proximal the cylinder first end (e.g., distal the pump interface 390), and the back face is proximal the cylinder second end (e.g., proximal the force mechanism 100, the piston rod, pump interface 390, etc.). The piston head 330 preferably has a cross-section that is complementary to and/or a substantially similar shape and/or size as the cylinder inner perimeter but can additionally or alternatively be smaller. If the piston head size is smaller than the cylinder cross-section, the piston head 300 can include a seal around the outer perimeter (e.g., example shown in FIG. 2), wherein the width of the seal can make up the difference between the piston head outer perimeter and the cylinder inner perimeter. The seal can be an O-ring, a wave seal, and/or any other suitable seal. The piston head 330 is preferably circular but can alternatively be square, rectangular, ovular, irregular (e.g., wavy), or another suitable shape.

The piston head 330 can be wider than the piston rod 340, have the same dimensions as the piston rod (e.g., in one or more axes), and/or be otherwise sized relative to the piston rod. The piston head 330 can be constrained in all directions and/or directions of rotation except for motion along the cylinder axis or be unconstrained.

The pump 1000 preferably includes one piston head per cylinder 200 but can alternatively include more than one piston head per cylinder 200. The pump 1000 preferably includes one piston head per pump but can alternatively include more than one piston head per pump. In a first example where the pump 1000 includes more than one piston head per pump, the pump 1000 can include two parallel or non-parallel cylinders on one side of the force mechanism 100 with a piston head in each cylinder 200. In a second example, the pump 1000 can include a piston head 330 on either side of the force mechanism 100 (e.g., where each piston head 330 reciprocates within a different cylinder 200). However, the pump 1000 can include any suitable number of piston heads in any suitable configuration.

However, the piston head 330 can be otherwise configured.

The piston rod 340 functions to connect the piston head 330 to the pump interface 390 and/or the force mechanism. The piston rod 340 can be centered on the piston head 330, offset from the piston head center, offset from the cylinder 200 central axis, and/or otherwise arranged. The piston rod 340 preferably has a smaller diameter than the piston head 330 but can be otherwise dimensioned relative to the piston head 330. The piston rod 340 can include one member but can alternatively include multiple parallel or non-parallel members. The piston rod 340 can include a first end and a second end opposing the first end. The first end is preferably mounted to the piston head 300 (e.g., rotatably mounted, statically mounted, etc.), preferably to the back of the piston head but alternatively to the front of the piston head, but can additionally or alternatively be mounted to the pump interface 390, be mounted to the force mechanism 100, and/or be mounted to any other suitable component. The second end is preferably mounted to the piston interface 390 but can additionally or alternatively be mounted to the piston head 330, the force mechanism 100, and/or to any other suitable component.

The piston rod 340 is preferably mounted to the pump interface 390 but can alternatively be disconnected from the pump interface. The piston rod 340 can be mounted to the pump interface 390 at the first end, the second end, at an intermediate point (e.g., along the length of the piston rod 340), and/or at any other suitable location.

The piston rod 340 can be made of the same or different material from the piston head 330. The piston rod 340 is preferably a separate component from the piston head 330 but can additionally or alternatively be a unitary piece with the piston head 330. The piston rod 340 can be a separate piece from the pump interface 390 or be a unitary piece with the pump interface 390. The piston rod 340 can be formed from a singular piece of material, multiple components, or otherwise constructed.

In a specific example, the piston rod 340 can include a surface between the piston rod 340 and cylinder shoulder. In an example, the piston rod 340 can include a sleeve 345 around the core of the piston rod 340 (e.g., to facilitate a tighter, longer-lasting seal against the cylinder 200). The sleeve 345 can be a pipe but can alternatively be any other hollow extruded shape. The sleeve 345 can preferably be aluminum but can alternatively be steel, plastic, ceramic, and/or another suitable material. In a specific example, the sleeve 345 can be slightly oversized in the direction of the piston rod center axis to reduce the axial tolerances of a piston rod 340 made of multiple parts connected in series. However, the sleeve can have any other suitable geometry. Alternatively, the piston rod 340 does not include a sleeve 345 (e.g., a seal is formed directly against the piston rod 340 core).

The pump interface 390 of the pump functions to interface with the actuator interface 190 of the force mechanism 100.

Each pump can include one or more pump interfaces 390. The pump interface 390 can: receive and transfer linear force from the force mechanism 100 to the piston 300, convert rotational or arcuate forces from the actuator interface 190 into linear forces, and/or otherwise interface with the actuator interface.

The pump interface 390 is preferably located on the piston 300 but can alternatively be located on the cylinder 200 and/or any other suitable portion of the pump. In a variant where the pump interface 390 is a scotch yoke, the actuator interface 190 can slide within the yoke, can roll around the inner surface of the yoke, can attach to a component within the yoke, and/or can otherwise interface with the scotch yoke.

Preferably, the pump interface 390 couples to and/or mates with the actuator interface 190. Alternatively, the pump interface 390 can be integrated with the force mechanism 100 (e.g., an eccentric mass can be fixed to the piston 300). The pump interface 390 can be coupled to the actuator interface 190 by a static or mobile connection.

In a first variant, the actuator interface 190 sits within and actuates along an inner track or race of the pump interface 390. In a second variant, the pump interface 390 is connected to the actuator interface 190 by a linkage or bearing. In a third variant, the pump interface 390 and actuator interface 190 are connected by a fixed connection and/or are fused (e.g., the force mechanism 100 is fixed to the piston 300). However, the pump interface 390 and actuator interface 390 can be otherwise coupled.

In a first example, the pump interface 390 can be a scotch yoke slot. In this example, the scotch yoke slot can be stadium shaped but can alternatively be circular, ovular, rectangular, or any other suitable shape. In this example, the actuator interface 190 can roll around the inner perimeter of the scotch yoke, move linearly within the scotch yoke, or otherwise move relative to the scotch yoke. In a specific example, the scotch yoke can include a shoulder 391 along one face, which constrains the actuator interface 190 (e.g., a bearing) from translating through the slot in the direction of the bearing axis (e.g., the shoulder prevents the bearing from "falling through" the slot).

In a second example, the pump interface 390 can be a slider. In a third example, the pump interface 390 can be a follower (e.g., a roller follower, a flat-faced follower, a knife edge follower, etc.). In a fourth example, the pump interface 190 can be a cam. However, the pump interface can be any other suitable pump interface.

The pump interface 390 can move along a path that extends along the cylinder center axis, parallel to the cylinder center axis, perpendicular with the cylinder center axis, angled relative to the cylinder center axis, an epitrochoid path, a hypotrochoid path, and/or any other suitable path.

The pump interface 390 can be connected to the piston 300, the cylinder 200, and/or any other suitable pump component. The pump interface 390 can be connected to the pump component by a static or mobile connection. In a first variant, the pump interface 390 can be connected to the piston rod 340 at the piston rod second end, but alternatively the pump interface 390 can be connected to the piston rod 340 at another point (e.g., an intermediate point along the piston rod 340). In a second variant, the pump interface 390 can be connected to the piston head 330 directly (e.g., at the front face, back face, and/or at another suitable point). In a third variant, the pump interface 390 can be connected to the cylinder 200 (e.g., in a variant where cylinder 200 is not fixed relative to the housing 10 and/or wheel). In this variant, the pump interface 390 can be connected to the inside of the cylinder 200, the outside of the cylinder 200, and/or at another suitable point. However, the pump interface 390 can be connected to the piston/or cylinder at any other suitable point.

In a specific example, the pump interface 390 can be a stadium-shaped scotch yoke located at the piston rod second end, with the length of the scotch yoke perpendicular to the cylinder axis. The actuator interface 190 can be a bearing sitting in the scotch yoke. The bearing can be radially constrained by the edges of the scotch yoke and axially constrained by a shoulder 391 following the scotch yoke path (e.g., wherein the shoulder 391 can be arranged axially inward or outward of the path). The bearing can be connected to an eccentric mass at the bearing bore (e.g., press fit, adhesive, other connection), allowing the eccentric mass and bearing outer perimeter to rotate relative to each other.

However, the pump interface 390 can be otherwise configured.

Fluid Volumes.

The pump 1000 can define a first stage 410, a second stage 420, an intake fluid path 510, an inter-stage fluid path 520, an exhaust fluid path 530, and/or other suitable fluid volumes.

The fluid volumes can be defined by individual pump components, be cooperatively defined by a combination of pump components, be defined by auxiliary components, and/or be otherwise defined. Each pump can include a single instance of each fluid volume but can additionally or alternatively include multiple instances of each fluid volume.

The first stage 410 functions to pressurize working fluid to a first pressure. The first stage 410 is preferably defined between the cylinder first end and the piston front face (e.g., in front of the piston or piston head); but can additionally or alternatively be defined between the cylinder second end and the piston back face (e.g., behind the piston or piston head), or be otherwise defined. The first stage 410 can be fluidly connected to the intake fluid path 510, the inter-stage fluid path 520, and/or any other suitable fluid paths. However, the first stage 410 can be otherwise configured.

The second stage 420 functions to pressurize working fluid from an initial pressure to a second pressure. The first pressure of the first stage 410 (e.g., highest pressure) can be equal to the initial pressure of the second stage 420 (e.g., lowest pressure), but alternatively can be higher or lower than the first pressure of the second stage 420. The second pressure can be higher than the first pressure. The second stage 420 is preferably defined between the cylinder second end and the piston back face (e.g., in behind the piston or piston head); but can additionally or alternatively be defined between the cylinder first end and the piston front face (e.g., in front of the piston or piston head), or be otherwise defined. The second stage 420 can be fluidly connected to the inter-stage fluid path 520, the exhaust fluid path 530, and/or any other suitable fluid paths. However, the second stage 420 can be otherwise configured.

The fluid paths function to fluidly connect different fluid regions. Fluid paths can be defined by single pump components but can alternatively be defined by multiple pump components. A pump 1000 can include at least one fluid path, including but not limited to: an intake fluid path 510, inter-stage fluid path 520, and exhaust fluid path 530. Each fluid path can include at least one valve or no valves.

Valves function to control working fluid flow between the working fluid source, first stage 410, second stage 420, the fluid sink (e.g., reservoir, tire, etc.), and/or any other suitable fluid volume. Valves can include multiple valves in parallel or in series. Valves can be sandwiched between, adhered to, press fit into, welded to, and/or fit to other components using any suitable mechanism. The valves can be passive (e.g., open when a cracking pressure is met, open when a pressure differential across the valve meets or exceeds a threshold difference, etc.), active (e.g., driven by a solenoid, a motor, pneumatic actuator, etc.), or otherwise configured. Examples of valves that can be used include passive check valves, ball check valve, diaphragm valve, non-return flap valve, solenoid valve, butterfly valve, and/or other valves. The valves are preferably one-way valves but can alternatively be two-way valves. For check valves, a cracking pressure can be determined: during manufacturing, by adjusting a spring mechanism, by swapping out a valve, and/or by adjusting an adjustable screw or set screw. All or a subset of fluid paths can include at least one valve. Different fluid paths can use different valve types (e.g., check valve, active valve, a membrane, no valve, and/or any other valve type). However, valves can be any other suitable type of valve.

The intake fluid path 510 functions to fluidly connect a working fluid source to the first stage 410. The working fluid source can be ambient air, the housing interior air, a working fluid tank, a working fluid treatment unit, and/or any other suitable working fluid source. The intake fluid path 510 can be defined through: the cylinder first end (e.g., through the center of the cylinder end cap or end plate, through a point offset from the center of the cylinder end cap or end plate, through a cylinder sidewall defining the first stage, etc.); the cylinder wall (e.g., proximal the first end), and/or through any other suitable component in any other suitable position. The intake fluid path 510 can include a single path or one or more sub-paths.

However, the intake fluid path 510 can be otherwise configured.

The intake fluid path 510 can include one or more intake valves 515 that control fluid flow through the intake fluid path. The intake valve 515 preferably permits fluid flow from the working fluid source into the first stage 410 (e.g., be a one-way valve), but can additionally or alternatively be a two-way valve and/or be any other suitable valve. The intake valve 515 can have a cracking pressure at 0 psig, 1 psig, 5 psig, 10 psig, 30 psig, 50 psig, above 50 psig, at a difference between the first stage intake pressure and the ambient pressure, within any open or closed range bounded by the aforementioned values, and/or any suitable cracking pressure. In a specific example, intake fluid path 510 includes an intake valve 515 (e.g., a check valve) sandwiched between parts (e.g., between a cylinder cap at the cylinder first end and the cylinder body). However, the valve can be otherwise mounted.

The intake valve 515 can open or close at any suitable point in a piston cycle. In examples, the intake valve 515 can open at a zero or near-zero pressure difference threshold (e.g., when the working fluid source pressure is slightly higher or lower than first stage pressure); opens at a nonzero first stage pressure relative to the working fluid source (e.g. −1 psig, −5 psig, −10 psig, −20 psig, within any open or closed range bounded by the aforementioned values, and/or any other suitable pressure difference); open over a range in the piston stroke (e.g., open at 260°, 270°, 280°, 290°, 300°, within any open or closed range bounded by the aforementioned values, etc.), and/or open when any other suitable condition is met. The intake valve 515 can close when the pressure difference exceeds a threshold (e.g., when the first stage pressure exceeds the working fluid source pressure); at a predetermined point in the piston cycle (e.g., at 0°, 10°, 20°, 30°, 40° within any open or closed range bounded by the aforementioned values, etc.), and/or close when any other suitable condition is met. Additionally or alternatively, the intake valve 515 opens variably across the stroke. In this variant, the piston 300 opens at a variable percentage at different pressure levels. In a specific example, the intake valve 515 opens within 15 degrees of 270° and closes within 15 degrees of 390°/30°. However, the intake valve 515 can open or close responsive to any suitable set of conditions.

However, the intake valve 515 can be otherwise configured.

The inter-stage fluid path 520 functions to fluidly connect the first stage 410 to the second stage 420. The inter-stage fluid path 520 can be defined through: the piston head 330 (e.g., center of the piston head, offset from the piston head center, etc.); the piston rod 340 (e.g., proximal the first end); a cylinder sidewall or tubing extending through the cylinder sidewall (e.g., include an inlet fluidly connected to the first stage 410 and an outlet fluidly connected to the second stage 420); and/or defined by any other suitable component. The inter-stage fluid path 520 can include a single path or one or more sub-paths.

In a first example, the inter-stage fluid path 520 can extend through the piston head thickness, from the piston head front to the piston head back, to a point beyond the piston rod outer diameter (e.g., to clear the piston rod) to fluidly connect to the second stage 420. The path can be: radial (e.g., defined by a radial slot in an inter-stage element 526; example shown in FIG. 3), linear, a spiral path, a curved path, and/or another suitable path shape. The path can extend: along the piston head axis and radially along the piston head back; extend through the piston head thickness at an angle (e.g., 10°, 30°, 45°, 60°, 80°, etc.); and/or be otherwise configured. In a second example, the inter-stage fluid path 520 can extend through both the piston head and the piston rod, wherein the outlet of the inter-stage fluid path 520 can be arranged along the piston rod broad face. However, the inter-stage fluid path 520 can be otherwise configured.

The inter-stage fluid path 520 can be created through a variety of means. In a first variant, the inter-stage fluid path 520 can be created when the piston head 330 is assembled with the piston rod 340. In a second variant, the inter-stage fluid path 520 can be created when the two-part piston head 330 is assembled (e.g., an inter-stage valve 525 can be sandwiched between two piston head parts). In a third variant, the inter-stage fluid path 520 can be machined into the cylinder body. In a fourth variant, the inter-stage fluid path 520 can be a tube (e.g., a tube discrete from the cylinder body) attached to first and second ports in the cylinder body. However, the inter-stage fluid path 520 can be otherwise formed or configured.

The inter-stage fluid path 520 can include one or more inter-stage valves that control fluid flow through the inter-stage fluid path 520. The inter-stage valve 525 preferably permits fluid flow from the first stage 410 into the second stage 420 (e.g., be a one-way valve), but can additionally or alternatively be a two-way valve and/or be any other suitable valve. The inter-stage valve 525 can have a cracking pressure at 0 psig, 1 psig, 5 psig, 10 psig, 30 psig, 50 psig, above 50 psig, within any open or closed range bounded by the aforementioned values, and/or any suitable cracking pressure.

The inter-stage fluid valve 525 can open or close at any suitable point in a piston cycle. In a first variant, the inter-stage valve 525 opens at zero pressure difference or a threshold pressure near 0 psig (e.g., when the first stage pressure is slightly higher than second stage pressure) and remains open as long as the pressure difference is slightly negative. In a second variant, the inter-stage valve 525 opens at a nonzero first stage absolute pressure (e.g., 20 psi, 25 psi, 30 psi, 35 psi, 40 psi, 45 psi, first stage target pressure, within any open or closed range bounded by the aforementioned values, and/or any other suitable pressure). In a third variant, the inter-stage valve 525 opens at a nonzero pressure difference between the first and second stage 420 (e.g. −5 psig, −10 psig, −20 psig, within any open or closed range bounded by the aforementioned values, and/or any other suitable pressure difference). In a fourth variant, the inter-stage valve 525 can open over a range in the piston stroke. The inter-stage valve 525 can open at 0°, 110°, 120°, 130°, 140°, 150°, within any open or closed range bounded by the aforementioned values, and/or any other piston position. The inter-stage valve 525 can close at 150°, 160°, 170°, 180°, 190°, 220° within any open or closed range bounded by the aforementioned values, and/or any other suitable piston position. In this variant, the inter-stage valve 525 can passively open at a fixed pressure threshold value or can actively open at a determined pressure or piston location. In a fifth variant, the inter-stage valve 525 can open variably across the forward stroke. In a sixth variant, the inter-stage valve 525 can be open across the entire forward stroke. However, the inter-stage valve 525 can open responsive to an alternative set of conditions.

However, the inter-stage fluid valve 525 can be otherwise configured.

The exhaust fluid path 530 functions to connect the second stage 420 with a working fluid sink. The working fluid sink can be: the reservoir, the tire, and/or any other suitable pressurization endpoint. The exhaust fluid path 530 can be fluidly connected to the working fluid sink by a tube, pipe, channels, flexible paths, rigid paths, and/or other fluid path.

Figure 6:
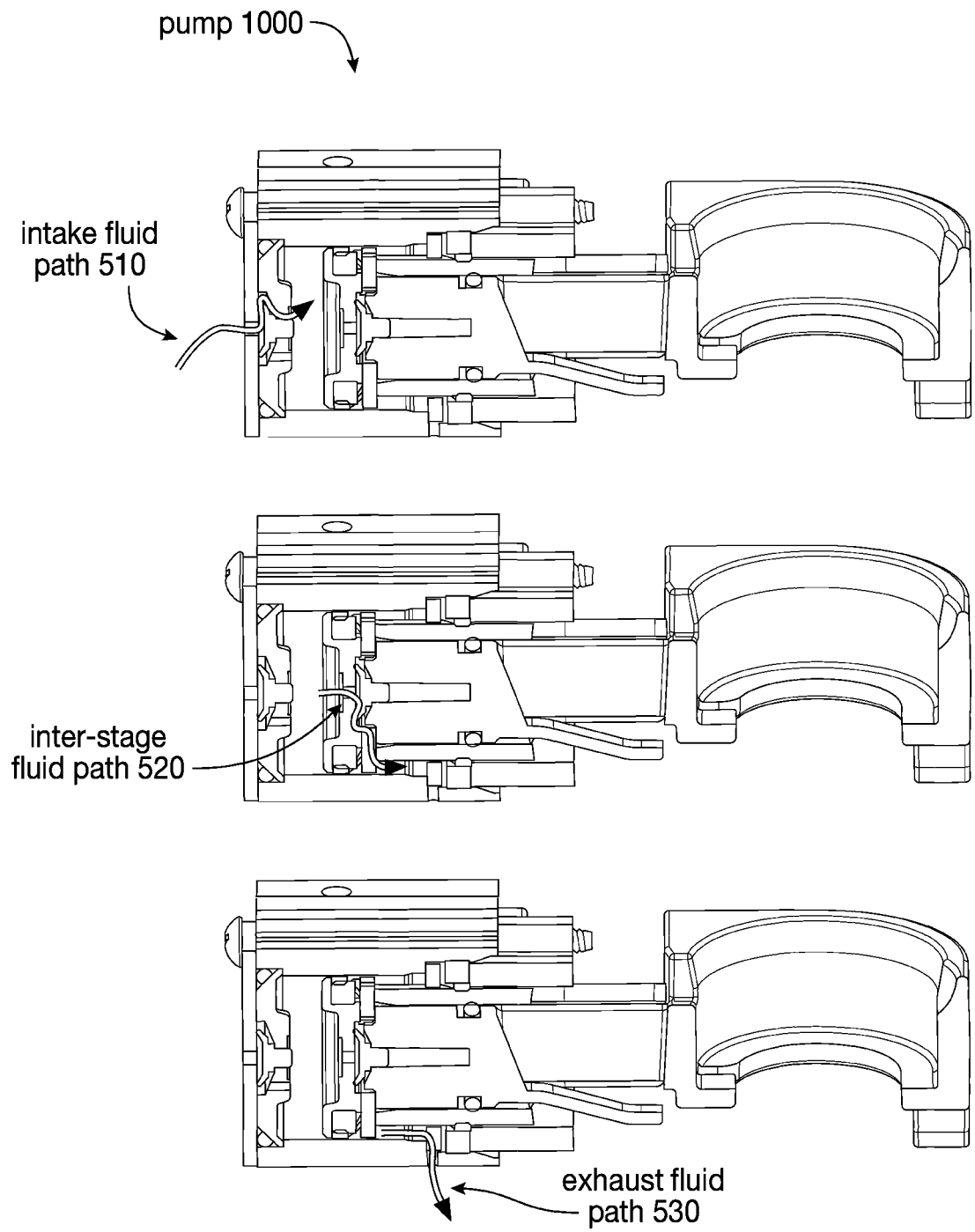
FIG. 6 is a set of cross-sectional views of a variant of the pump showing the fluid paths leading to and from the first stage and second stage.

The exhaust fluid path 510 can be defined through: the cylinder second end (e.g., center of the cylinder end cap or end plate, offset from the center of the cylinder end cap or end plate, through the cylinder wall defining the second stage, etc.); the cylinder wall (e.g., proximal the second end, proximal top dead center, at the 200°, 270°, 300°, 330°, 360°, or other cycle position, etc.), through the piston rod (e.g., extend from the piston rod broad surface or piston rod head along the piston rod length to a piston rod point outside of the cylinder, etc.) and/or through any other suitable component in any other suitable position. The exhaust fluid path 530 can include a single path or one or more sub-paths. In a variant where the cylinder 200 defines the exhaust fluid path 530, the exhaust fluid path 530 is preferably proximal the cylinder second end. In a first example of this variant, an exhaust port is at a point along the perimeter of the cylinder shoulder. In a second example of this variant, an exhaust port is forward (e.g., closer to the first end) relative to the shoulder. In a third example of this variant, the exhaust port can be axially coincident with (e.g., radially outward from) a spacer 90 (e.g., an annulus). In a fourth example of this variant, the exhaust fluid path 530 extends through the exhaust port in the second stage cylinder wall behind a spacer 90 separating the cylinder wall from the piston rod 340, where the non-circular (e.g., wave, square wave, zigzag, etc.) shape of the spacer 90 outer perimeter allows working fluid flow into the exhaust port (e.g., example shown in FIG. 6).

However, the exhaust fluid path 530 can be otherwise configured.

The exhaust fluid path 530 can include one or more exhaust valves that control fluid flow through the exhaust fluid path 530. The exhaust valve preferably permits fluid flow from the second stage 420 to the working fluid sink (e.g., be a one-way valve), but can additionally or alternatively be a two-way valve and/or be any other suitable valve. The exhaust valve can have a cracking pressure at the reservoir pressure, target tire pressure, at 30 psig, 50 psig, 60 psig, 70 psig, 80 psig, 90 psig, 100 psig, above 100 psig, below 30 psig, and/or any other suitable cracking pressure.

The exhaust valves can open or close at any suitable point in a piston cycle. In a first variant, the exhaust valve opens at zero or a pressure threshold near zero (e.g., when the second stage pressure is slightly higher than the reservoir pressure) and remains open as long as the pressure difference is slightly negative. In a second variant, the exhaust valve opens within a range of the second stage target pressure or target tire pressure. In an example, the exhaust valve opens within 0 psig, 1 psig, 10 psig, 20 psig, 50 psig, or another suitable range around the second stage target pressure or target tire pressure. In a specific example, the exhaust valve opens within 20 psi of 140 psig. In a third variant, the exhaust valve opens over a set range in the piston stroke. The exhaust valve can open at 300°, 310°, 320°, 330°, 340°, within any open or closed range bounded by the aforementioned values, and/or any other piston position. The exhaust valve can close at 340°, 350°, 360°, 370°/10°, 380°/20° within any open or closed range bounded by the aforementioned values, and/or any other suitable piston position. In a fourth variant, the exhaust valve can be open over the entire backwards stroke and closed during the entire forward stroke. In a fifth variant, the exhaust valve can be open during both a forward and backward stroke.

However, the exhaust valve can be otherwise configured.

The pump can include a set of seals which function to prevent working fluid flow (e.g., maintain fluid isolation) between the working fluid source, the first stage 410, the second stage 420, the working fluid sink, the ambient environment, and/or any other suitable fluid volume. Seals can seal the space between the piston head 330 and the cylinder 200 (e.g., where a piston head seal 61 is connected to the piston head 330 and slides against the cylinder wall). Additionally or alternatively, seals can seal the space between the piston rod 340 and the cylinder 200 (e.g., where a piston rod seal 62 is connected to the cylinder wall and slides against the piston rod 340). Seals can be: O-rings, wave seals, energizing seals (e.g., an O-ring with a square cross-section, a seal with a predetermined spring constant or compliance, etc.), tape, foam, and/or any other suitable seal. In an illustrative example, a seal can include a wave seal and an energizing seal (e.g., coaxially aligned, arranged radially inward or outward of the energizing seal, etc.), wherein the energizing seal provides "give" so that the wave seal can more easily bend around the counter-face without being constrained by the surface on the opposite side of the energizing seal. However, the seals can be otherwise configured and/or located.

Wave seals can have a circular profile when projected onto a plane orthogonal to a seal central axis (e.g., circular profile from the top down) or when viewed orthogonally from the cylinder second end looking toward the cylinder first end. Wave seals can have a wave profile when projected onto a plane parallel to the seal central axis (e.g., when the pump 1000 is viewed orthogonally from the side). The wave shape can be sinusoidal, semicircular, zigzag, square, or any other wave shape. The wave amplitude and frequency can be tailored based on seal height, seal expansion requirements, wear requirements, and other suitable factors. However, the wave seal can be otherwise shaped.

The pump 1000 can optionally include a set of sensors, which function to monitor system operation. Sensors can monitor pressure, temperature, humidity, acceleration, particulate concentration, composition, and/or any other suitable metric of the working fluid. Sensors can additionally or alternatively monitor the temperature or acceleration of the system's component parts. Sensors can be placed in the ambient air, working fluid source, intake fluid path 510, first stage 410, inter-stage fluid path 520, second stage 420, exhaust fluid path 530, reservoir, tire, and/or at any other suitable component in the system. Sensors can include capacitive sensors, optical sensors, digital sensors, piezoresistive pressure sensors, resistive humidity sensors, thermal humidity sensors, thermocouple, thermistor, IR sensors, gyroscopes, and any other suitable sensor type. Sensors can communicate with a processing system which functions to control vehicle and pump operation and/or display information to a driver. However, the system sensors can be otherwise configured.

The pump 1000 can optionally include one or more water management systems which function to manage the humidity and/or liquid content of system cavities. Water management systems can include desiccants, purging systems, evaporation systems, and other water management mechanisms. Water management systems can be located in the ambient air, working fluid source, intake fluid path 510, first stage 410, inter-stage fluid path 520, second stage 420, exhaust fluid path 530, reservoir, tire, before any of the aforementioned components, after any of the aforementioned components, and/or at any other suitable component in the system.

The pump 1000 can optionally include a cooling system, which functions to cool the pump components. The cooling system can be active or passive. The cooling system can surround the cylinder 200, be attached to a part, can be located within the head, and/or can be integrated with another part of the pump 1000. The cooling system can be convective, conductive, radiative, and/or use any other suitable cooling mechanism. The cooling system can be thermally connected to a heat sink (e.g., ambient environment, housing 10, etc.), or can otherwise dispose of waste heat.

The cooling system can be convective, wherein the fluid medium can be air, refrigerant, water, deionized water, oil, working fluid, or another suitable fluid. The fluid medium conductivity can be 0.014, 0.3, −5, 0.6, within any open or closed range bounded by the aforementioned values, and/or any other fluid conductivity. The cooling component can be a thermally conductive cylinder 200 (e.g., the cylinder 200 can be thermally conductive), a thermally conductive piston head 330, a thermally conductive piston rod 340, and/or another cooling component. The cooling component can have any surface shape, including fins (e.g., on the inside and/or outside of the cylinder 200), channels (e.g., along the length of piston reciprocation), divots (e.g., random, honeycomb, etc.), or another suitable surface shape. In an example, fins can extend down the outer surface of the cylinder body in the direction of piston reciprocation.

Convective cooling systems can be open or closed systems. Open convective cooling systems can be exposed to an ambient fluid medium or can be exposed to a fluid medium being forced across the surface of the cylinder body.

In a first variant, the cooling system can include a cooling channel 81 or set of cooling channels parallel to the cylinder 200. The cooling channel 81 can be open on both sides (e.g., open on the side proximal and parallel to the cylinder first end and the side distal the cylinder first end), open on one side, open on only the lateral side (e.g., a side parallel with cylinder central axis), or partially open on a side or set of sides (e.g., holes in the cooling channel walls). The cooling channel 81 can have any cross-sectional shape (e.g., circle, rectangle horseshoe around the cylinder, donut around the cylinder, an irregular shape, etc.). The shape of the cooling channel 81 can vary along the length of the channel (e.g., in the direction of piston reciprocation) or be constant. A cooling head 82 can function to force fluid medium in and out of the cooling channel 81 (e.g., example shown in FIG. 14). The cooling head 81 is preferably complimentary to the inner profile of the cooling channel 81 but can be otherwise shaped. In examples, the cooling rod can include fins interdigitated with cooling fins extending from the cooling component. The cooling head 82 can be integrated into the piston 300 (e.g., include a cooling rod extending parallel to the piston rod 340 and actuate along with piston actuation), be a separate component (e.g., actuate independently of piston actuation), and/or be otherwise related to the piston 300. The cooling head 82 is preferably solid but can alternatively have holes, channels, be hollow, and/or be otherwise constructed. However, a cooling piston system can be otherwise implemented.

In a second variant, the cooling system can include a valve diverting pressurized working fluid from the first stage 410 or second stage 420 to the outer surface of the cylinder body (e.g., cooling the cylinder body using working fluid drawn in by entrainment).

In a third variant, the cooling systems can include a cooling fluid (e.g., pressurized working fluid, refrigerant, ambient air, etc.) that is forced across the outer surface of the cylinder body, the piston, and/or any other suitable pump component (e.g., by a fan, blower, vehicle motion, etc.).

In a fourth variant, the cooling systems can include a heat pump, refrigeration system, heat exchanger, and/or other conductive system thermally connected to the pump 1000.

In a fifth variant, the cooling system can include fins attached to pump components and/or a radiative coating configured to radiate heat to the housing 10 and/or ambient air.

However, the cooling system can include a combination of cooling system variants or be otherwise configured.

4. Method

Figure 7:
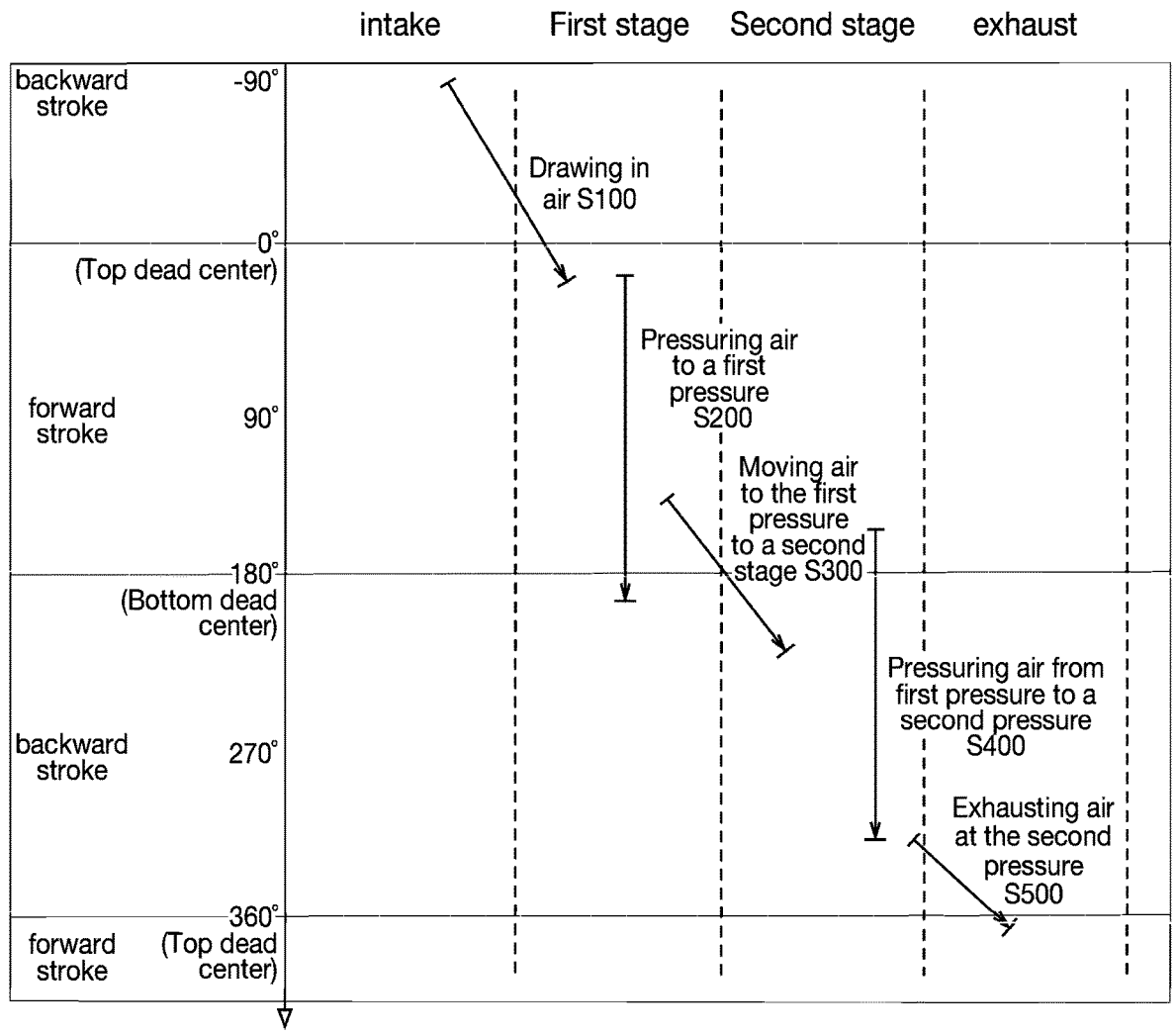
FIG. 7 is a schematic representation of a variant of working fluid flow through the pump stages.

The method functions to passively pressurize working fluid for a tire at the wheel end using a two-stage pump. The method can include: drawing in working fluid S100, pressurizing working fluid to a first pressure S200, moving working fluid at the first pressure to a second stage S300, pressurizing working fluid from the first pressure to a second pressure S400, and exhausting the working fluid at the second pressure S500 (e.g., example shown in FIG. 7 and FIG. 8). One or more stages of the method from successive iterations preferably occur contemporaneously (e.g., concurrently, at substantially the same time, etc.), but can additionally or alternatively occur serially or with any other suitable temporal relationship.

The method is preferably performed using the pump 1000 described above but can be performed by any other suitable pump. The method can be performed during wheel rotation, during energy harvesting, while the power supply exceeds a predetermined state of charge, and/or at any other suitable time.

Drawing in working fluid S100 functions to supply working fluid to a pumping apparatus first stage 410 from a working fluid source. In a first variant, drawing in working fluid S100 can be performed while the intake valve 515 is open and working fluid flows into the first stage 410 from the working fluid source (e.g., during a last portion of the backward stroke and a first portion of the forward stroke). In a second variant, working fluid can be pumped in from another source (e.g., a first pump in a series); thus, drawing in working fluid S100 can occur at any time. S100 preferably starts between 180°-300° (e.g., 250°, 260°, 270°, 280°, etc.) after TDC (e.g., wherein TDC is when the second stage is completely compressed and/or the piston is fully retracted) but can additionally or alternatively start at any other suitable point in the cycle. S100 can preferably end at TDC, can end within 10° of TDC, can end between 100-200° (e.g., 120°, 130°, 140°, etc.) past TDC, but can additionally or alternatively end at any other suitable point in the cycle.

In a specific example, during step S100, the piston backward stroke can create a negative pressure differential between the working fluid source (e.g., ambient air) and the first stage 410. The negative pressure differential can cause an intake valve 515 (e.g., a check valve) to open, which, combined with the negative pressure differential, can cause working fluid to flow into the first stage 410 (e.g., example shown in FIG. 9). The piston forward stroke can cause pressure within the first stage 410 to increase, reducing the negative pressure differential. The reduction or reversal of the negative pressure differential can cause the intake valve 515 to close, ending step S100.

However, the pump can otherwise draw working fluid into the first stage.

Pressurizing working fluid to a first pressure S200 functions to increase the pressure of drawn-in working fluid. S200 preferably occurs in the first stage 410 but can additionally or alternatively occur in both the first and second stages, or in any other suitable fluid volume. S200 preferably occurs after S100 but can additionally or alternatively happen during all or part of S100 or at any other suitable time. The first pressure can be the pressure of the first stage 410 when the inter-stage valve 525 opens, the pressure of the first stage 410 when the inter-stage valve closes, the maximum pressure of the first stage 410 during the stroke, or any other pressure valve bounded by the aforementioned values. S200 preferably occurs during a forward stroke of the piston (e.g., the entirety of the forward stroke, a portion of the forward stroke, etc.), but can additionally or alternatively occur during a backward stroke. The intake valve 515 and inter-stage valve 525 are preferably closed during S200; alternatively, the inter-stage valve 525 can be open, the intake valve 515 can be open, and/or the valves can be in any other suitable position. S200 preferably starts between 0°-100° (e.g., 0°, 20°, 30°, 40°, 50°, 60°, etc.) after TDC, but can additionally or alternatively start at any other suitable point in the cycle. S200 preferably ends between 100-200° (e.g., 120°, 130°, 140°, etc.) past TDC, but can additionally or alternatively end at any other suitable point in the cycle.

However, the pump can pressurize working fluid to a first pressure by any other suitable method.

Figure 9:
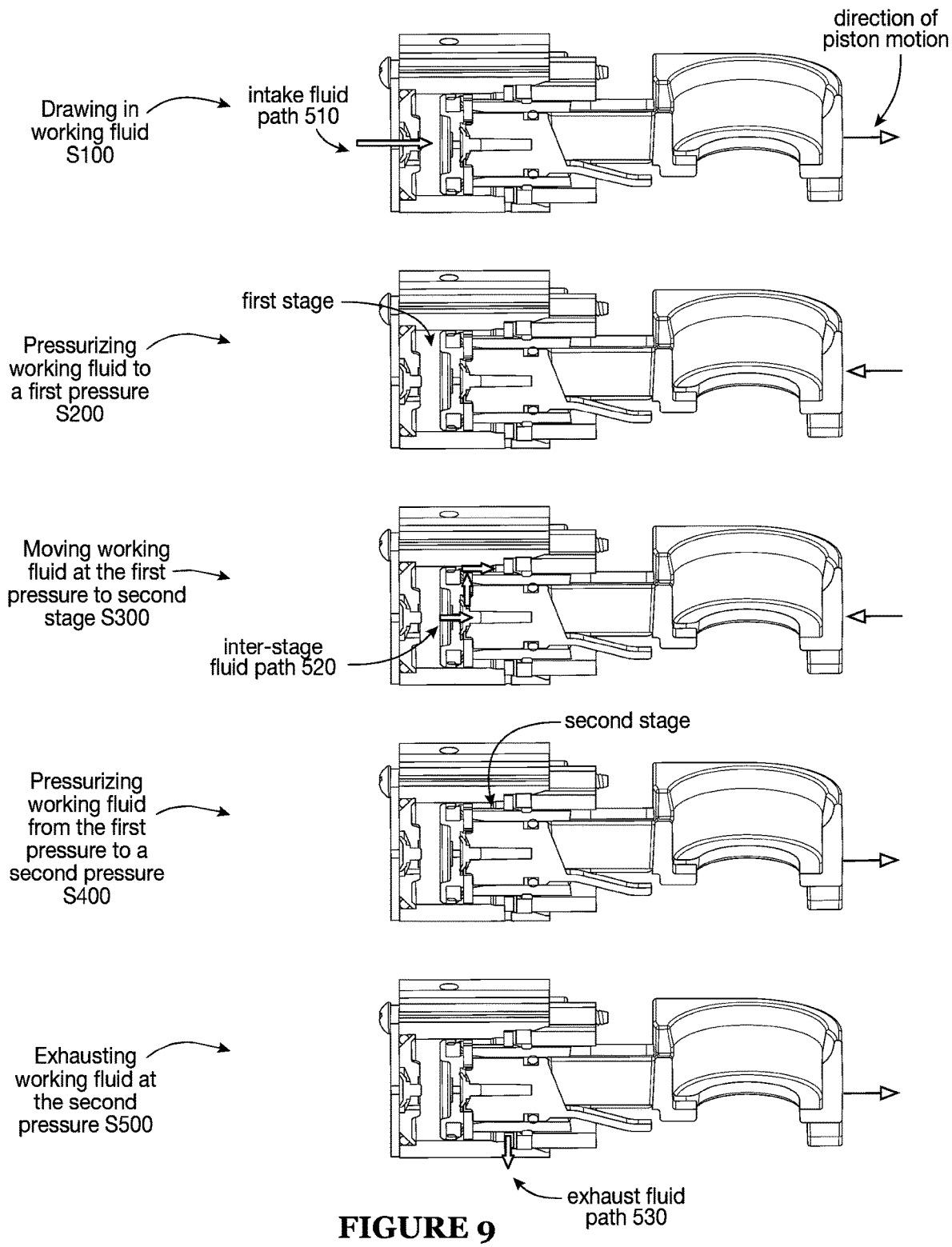
FIG. 9 is an illustrative example of a variant of the method.

Moving working fluid at a first pressure to a second stage S300 functions to move working fluid pressurized to the first pressure from the first stage 410 to the second stage 420 for further pressurization (e.g., example shown in FIG. 9). S300 can occur after S200, during part of S200 (e.g., a latter part of S200), and/or at any other suitable item. S300 preferably occurs during a forward stroke of the piston (e.g., the latter portion of the forward stroke, the entirety of the forward stroke etc.), but can additionally or alternatively occur during all or part of the backward stroke (e.g., the initial portion of the backward stroke, the entirety of the backward stroke, etc.). The inter-stage valve 525 is preferably open during S300 but can additionally or alternatively be partially or entirely closed. S300 preferably starts between 100-200° (e.g., 120°, 130°, 140°, etc.) past TDC but can additionally or alternatively start at any other suitable point in the cycle. S300 preferably ends between 130-270° (e.g., 140°, 160°, 185°, 200°, etc.) past TDC (e.g., about 55° later), but can additionally or alternatively end at any other suitable point in the cycle.

In a specific example, the forward stroke of the piston 300 can cause the first stage volume to decrease and the second stage volume to increase, thus increasing first stage pressure and decreasing second stage pressure. When the first stage pressure exceeds the second stage pressure (e.g., near 130°), the inter-stage valve 525 (e.g., the check valve) opens and working fluid in the first stage 410 flows through the inter-stage fluid path 520 into the second stage 420. The backward stroke of the piston 300 causes the first stage pressure to decrease and the second stage pressure to increase. When the second stage pressure exceeds the first stage pressure (e.g., near 185°), the inter-stage valve 525 closes and working fluid flow between the two stages stops.

However, the pump can otherwise move working fluid at a first pressure to a second stage.

Pressurizing working fluid from a first pressure to a second pressure S400 functions to increase the pressure of working fluid at the first pressure to a second pressure. The second pressure can be the maximum pressure of the second stage 420, the pressure of the tire, the threshold pressure required to open the exhaust valve, or any other pressure value bounded by the aforementioned values. S400 preferably occurs in the second stage 420 but can additionally or alternatively occur in both the first and second stages, or in any other suitable fluid volume. S400 preferably occurs after S300 but can additionally or alternatively occur during all or part of S300 or at any other suitable time. All or portions of S400 can occur contemporaneously with (e.g., concurrently with) S100 (e.g., from a subsequent cycle) or can occur asynchronously with S100. S400 preferably occurs during the backward stroke of the piston (e.g., the entirety of the backward stroke, the latter part of the backward stroke, etc.), but can additionally or alternatively occur during all or part of the forward stroke. The inter-stage valve 525 and exhaust valve are preferably closed during S400; alternatively, the inter-stage valve 525 can be open, the exhaust valve can be open, and/or the valves can be in any other suitable position. S400 preferably starts between 100°-270° (e.g., 140°, 160°, 185°, 200θ, 230°, 250°, etc.) past TDC, but can additionally or alternatively start at any other suitable point in the cycle. S400 preferably ends between 280°-350° (e.g., 300°, 310°, 320°, 330°, etc.) past TDC, but additionally or alternatively end at any other suitable point in the cycle.

In a specific example, the backward stroke of the piston 300 causes the volume of the second stage 420 to decrease and the inter-stage valve 525 to close, thus increasing the pressure of the second stage 420. In this specific example, S400 ends when the exhaust valve opens.

However, the pump can otherwise pressurize the working fluid from a first pressure to a second pressure.

Exhausting working fluid at the second pressure S500 functions to flow pressurized working fluid from the second stage 420 into the reservoir. S500 preferably occurs after S400 but can additionally or alternatively occur during all or part of S400, all or part of S100, S500 preferably occurs during the backward stroke of the piston (e.g., the entirety of the backward stroke, the latter part of the backward stroke, etc.), but can additionally or alternatively occur during all or part of the forward stroke, or at any other suitable time. The inter-stage valve 525 is preferably closed and the exhaust valve is preferably open during S500; alternatively, the inter-stage valve 525 can be open, and/or the valves can be in any other suitable position. S500 preferably starts between 280°-350° (e.g., 300°, 310°, 320°, 330°, etc.) past TDC, but additionally or alternatively start at any other suitable point in the cycle. S500 can end at 360° (e.g., TDC), after TDC (e.g., 10° after, 20° after, etc.), and/or at any other suitable point in the cycle.

In a specific example, the backward stroke can cause the volume of the second stage 420 to decrease, thus increasing second stage pressure. When the pressure of the second stage 420 exceeds the pressure of the reservoir, the exhaust valve can open (e.g., near 320°) and working fluid at the second pressure can flow from the second stage 420 into the reservoir. At the beginning of the forward stroke, the second stage pressure can decrease below the reservoir pressure and the exhaust valve can close (e.g., responsive to the pressure difference), ending S500 (e.g., near 360°). However, the pump can otherwise exhaust the working fluid.

Steps of the method can occur during the forward stroke and/or backward stroke of the piston 300. The forward stroke and backward stroke can occur during different arcuate ranges of the wheel rotation.

The forward stroke functions to pressurize working fluid in the first stage 410 and facilitate fluid transfer between the first and second stages. The forward stroke can occur while the piston head 330 and/or pump interface 390 moves towards the cylinder first end. In a first variant, the forward stroke can occur when the force vector applied to the pump interface 390 by the force mechanism 100 has a component pointing toward the cylinder first end (e.g., gravity acting on the eccentric mass, pulling the piston 300 towards the cylinder first end during vehicle motion). In a second variant, the forward stroke can occur when the force vector applied to the pump interface 390 by the force mechanism 100 points directly towards the cylinder first end. In variants, the forward stroke can be driven by a force vector changing in direction and/or magnitude based on wheel rotation or a force vector changing in direction and/or magnitude based on active actuation. However, the forward stroke can occur at any other suitable time.

The backward stroke functions to draw working fluid into the first stage 410, pressurize fluid in the second stage 420, and exhaust working fluid from the second stage 420. The backward stroke occurs while the piston head 330 and/or pump interface 390 moves away from the cylinder first end. In a first variant, the backward stroke can occur when the force vector applied to the pump interface 390 by the force mechanism 100 has a component pointing away from the cylinder first end. In a second variant, the backward stroke can occur when the force vector applied to the pump interface 390 by the force mechanism 100 points directly towards the cylinder first end. In variants, the backward stroke can be driven by a force vector changing in direction and/or magnitude based on wheel rotation or a force vector changing in direction and/or magnitude based on active actuation. However, the backward stroke can occur at any other suitable time.

In variants, piston reciprocation can also drive the cooling system. During a backward stroke (and/or a forward stroke), working fluid (e.g., environmental air, housing air, etc.) can be drawn into the cooling channel 81 on a first side of the cooling head 82 (e.g., either in front of or behind the cooling head in the direction of piston reciprocation) by the backward motion of the cooling head 82. While in the cooling channel 81, working fluid on the first side of the cooling head 82 can gain heat through convection from the cooling channel walls (e.g., heat from the cylinder body). During the forward stroke (and/or backward stroke), the working fluid on the first side of the cooling head 82 can be forced out of the cooling channel 81 by the forward motion of the cooling head 82. Optionally the aforementioned cooling process can occur in duplicate on the opposite side of the cooling head 82. In variants, the first side of the cooling head can be the side of the cooling head proximal or distal the cylinder first end.

All or portions of the method can be performed in real time (e.g., responsive to a request), iteratively, concurrently, asynchronously, periodically, and/or at any other suitable time. All or portions of the method can be performed automatically, manually, semi-automatically, and/or otherwise.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

All references cited herein are incorporated by reference in their entirety, except to the extent that the incorporated material is inconsistent with the express disclosure herein, in which case the language in this disclosure controls.

As a person skilled in the art will recognize from the previous detailed description and from the figures and claims, modifications and changes can be made to the preferred embodiments of the invention without departing from the scope of this invention defined in the following claims.

I claim:

1. A pump, comprising:
   a cylinder comprising a cylinder first end and a cylinder second end;
   a piston housed within the cylinder and comprising a piston front face, piston back face, and a piston rod extending through the cylinder second end, wherein the cylinder and piston cooperatively define:
      a first stage between the cylinder first end and the piston front face; and
      a second stage between the cylinder second end and the piston back face;
   wherein the piston is operable between:
      a forward stroke, during which the piston pressurizes working fluid within the first stage to a first pressure and forces the working fluid from the first stage into the second stage; and
      a backward stroke, during which the piston pressurizes working fluid from the first pressure to a second pressure within the second stage and forces the working fluid from the second stage out of the pump;
   a set of cylinder cooling channels thermally connected to and extending alongside the cylinder; and
   a set of cooling heads mounted to the piston and complementarily nested within the cylinder cooling channels;
   wherein actuation of the piston relative to the cylinder actuates the cooling heads within the cylinder cooling channels to convect heat from the cylinder.

2. The pump of claim 1, wherein working fluid is drawn into the first stage from an ambient environment during the backward stroke.

3. The pump of claim 1, further comprising an intake fluid path defined through the cylinder first end and fluidly connecting a working fluid source with the first stage.

4. The pump of claim 1, further comprising an inter-stage fluid path defined through the piston and fluidly connecting the first stage with the second stage, wherein the piston is configured to force the working fluid at the first pressure through the inter-stage fluid path during the forward stroke.

5. The pump of claim 1, further comprising an exhaust fluid path defined through the cylinder and fluidly connecting the second stage with a fluid reservoir, wherein the piston is configured to force the working fluid at the second pressure through the exhaust fluid path during the backward stroke.

6. The pump of claim 1, wherein the piston comprises a scotch yoke, wherein the pump is connected to a force mechanism comprising a cam rotatably housed within the scotch yoke.

7. The pump of claim 6, wherein the force mechanism further comprises a hanging mass statically connected to the cam and configured to rotatably mount to a rotary surface.

8. The pump of claim 1, wherein forcing the working fluid within the second stage out of the pump comprises forcing the working fluid into a tire.

9. A tire inflation system comprising:
- a cylinder;
- a piston comprising a piston head housed within the cylinder, wherein the piston head divides the cylinder into a first stage and a second stage, wherein the first stage is fluidly connected to an ambient environment and the second stage, and the second stage is fluidly connected to a fluid reservoir;
- wherein the piston is configured to operate between:
  - a forward stroke that pressurizes fluid in the first stage to a first pressure and forces the fluid from the first stage into the second stage: and
  - a backward stroke that pressurizes fluid in the second stage from the first pressure to a second pressure and forces the fluid from the second stage into the fluid reservoir; and
- an integrated cooling system powered by piston actuation, wherein the integrated cooling system comprises:
  - a set of cylinder cooling channels thermally connected to and extending alongside the cylinder; and
  - a set of cooling heads mounted to the piston and complementarity nested within the cylinder cooling channels;
- wherein actuation of the piston relative to the cylinder actuates the cooling heads to force a cooling fluid through the cylinder cooling channels.

10. The tire inflation system of claim 9, wherein the first stage is fluidly connected to the second stage by an interstage path defined through the piston head.

11. The tire inflation system of claim 10, wherein the piston further comprises a piston rod extending through the second stage, wherein the interstage path extends through a thickness of the piston head and radially outward along a back of the piston head to a point beyond an outer diameter of the piston rod.

12. The tire inflation system of claim 9, further comprising:
- a housing mounting the cylinder and configured to statically mount to a wheel end; and
- a power source mounted to the housing.

13. The tire inflation system of claim 12, wherein the cylinder is statically mounted to the housing.

14. The tire inflation system of claim 9, further comprising a force mechanism, wherein the force mechanism drives the piston between the forward stroke and the backward stroke.

15. The tire inflation system of claim 14, wherein the force mechanism comprises a hanging mass rotatably mounted to the piston.

16. The tire inflation system of claim 15, wherein the force mechanism comprises a cam statically mounted to the hanging mass and rotatably connected to the piston, wherein cam rotation relative to the piston during piston rotation relative to the force mechanism applies an actuating force to the piston.

17. The tire inflation system of claim 16, wherein the piston comprises a scotch yoke, wherein the cam is rotatably connected to the piston at the scotch yoke.

* * * * *